US012617646B2

(12) United States Patent
Kobayashi et al.

(10) Patent No.: US 12,617,646 B2
(45) Date of Patent: May 5, 2026

(54) STACKING APPARATUS, STACKING METHOD, AND STACKING SYSTEM

(71) Applicant: KABUSHIKI KAISHA TOSHIBA, Tokyo (JP)

(72) Inventors: Yuko Kobayashi, Kawasaki Kanagawa (JP); Misato Ishikawa, Kawasaki Kanagawa (JP); Takamitsu Sunaoshi, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 154 days.

(21) Appl. No.: 18/174,384

(22) Filed: Feb. 24, 2023

(65) Prior Publication Data

US 2024/0010456 A1 Jan. 11, 2024

(30) Foreign Application Priority Data

Jul. 11, 2022 (JP) ................................. 2022-111239

(51) Int. Cl.
B65H 31/38 (2006.01)
B65H 29/40 (2006.01)
(Continued)

(52) U.S. Cl.
CPC ............. B65H 31/38 (2013.01); B65H 29/40 (2013.01); B65H 29/52 (2013.01); B65H 31/02 (2013.01);
(Continued)

(58) Field of Classification Search
CPC .. B65H 31/38; B65H 2301/441; B65H 29/28; B65H 2404/40; B65H 2701/1912;
(Continued)

(56) References Cited

U.S. PATENT DOCUMENTS 3,391,929 A * 7/1968 Blair ...................... B65H 31/40
271/213
4,593,896 A * 6/1986 Nakamura ......... B65H 31/3054
271/189
(Continued)

FOREIGN PATENT DOCUMENTS

JP H4-209158 A 7/1992
JP H7-76451 A 3/1995
(Continued)

OTHER PUBLICATIONS

Japan Patent Office, Office Action in JP App. No. 2022-111239 (May 13, 2025).
(Continued)

*Primary Examiner* — Jeremy R Severson
(74) *Attorney, Agent, or Firm* — Finnegan, Henderson, Farabow, Garrett & Dunner, LLP

(57) ABSTRACT

A stacking apparatus according to an embodiment includes a stacking table, a first guide member, a second guide member, and a vibrator. The stacking table includes a stacking surface on which sheets are sequentially stacked. The first guide member is provided to stand on the stacking table. The first guide member restricts position of edges in a first width direction of the sheets stacked on the stacking table. The second guide member is provided to stand on the stacking table. The second guide member restricts position of edges in a second width direction of the sheets stacked on the stacking table. The second width direction intersects with the first width direction. The vibrator applies micro-vibration to at least one of the first guide member and the second guide member.

15 Claims, 9 Drawing Sheets

(51) Int. Cl.
    *B65H 29/52*        (2006.01)
    *B65H 31/02*        (2006.01)
    *H01M 10/04*       (2006.01)

(52) U.S. Cl.
    CPC ....... *H01M 10/04* (2013.01); *B65H 2301/441*
        (2013.01); *B65H 2404/74* (2013.01); *B65H*
        *2405/112* (2013.01); *B65H 2405/113*
        (2013.01); *B65H 2405/114* (2013.01); *B65H*
        *2801/72* (2013.01)

(58) Field of Classification Search
    CPC ........ B65H 2405/112; B65H 2405/113; B65H
        2405/114
    See application file for complete search history.

(56)           References Cited

U.S. PATENT DOCUMENTS

| | | | |
|---|---|---|---|
| 5,890,713 A | 4/1999 | Hofmann et al. | |
| 7,887,040 B2 * | 2/2011 | Roth ...................... | B65H 29/32 |
| | | | 271/69 |
| 8,757,791 B2 * | 6/2014 | Tanaka ................... | B65H 31/26 |
| | | | 271/3.14 |
| 8,845,839 B2 | 9/2014 | Yuhara et al. | |
| 9,425,478 B2 | 8/2016 | Yuhara et al. | |
| 9,876,256 B2 * | 1/2018 | Aramaki ........... | H01M 10/0404 |
| 2008/0230984 A1 | 9/2008 | Kobayashi | |

| | | | | |
|---|---|---|---|---|
| 2014/0027067 A1 | 1/2014 | Yuhara et al. | | |
| 2021/0083313 A1 | 3/2021 | Kobayashi et al. | | |
| 2021/0245982 A1 | 8/2021 | Kobayashi et al. | | |
| 2023/0091085 A1 * | 3/2023 | Biberacher ....... | H01M 10/0463 |
| | | | 29/623.1 |

FOREIGN PATENT DOCUMENTS

| | | |
|---|---|---|
| JP | H9-175718 A | 7/1997 |
| JP | H11-5665 A | 1/1999 |
| JP | 2000-191221 A | 7/2000 |
| JP | 2008-94586 A | 4/2008 |
| JP | 2009-91153 A | 4/2009 |
| JP | 2012-14935 A | 1/2012 |
| JP | 2012-221715 A | 11/2012 |
| JP | 5101337 B2 | 12/2012 |
| JP | 2014-110160 A | 6/2014 |
| JP | 5666805 B2 | 2/2015 |
| JP | 5814588 B2 | 11/2015 |
| JP | 5901135 B2 | 4/2016 |
| JP | 5997877 B2 | 9/2016 |
| JP | 2021-48010 A | 3/2021 |
| JP | 2021-127181 A | 9/2021 |

OTHER PUBLICATIONS

Japan Patent Office, Office Action in JP Application No. 2022-111239, (Nov. 11, 2025).

* cited by examiner

TA (T)

31 (30)

TB (T)

32 (30)

32A

32C

32B

STACKING APPARATUS, STACKING METHOD, AND STACKING SYSTEM

CROSS-REFERENCE TO RELATED APPLICATIONS

This application is based upon and claims the benefit of priority from Japanese Patent Application No. 2022-111239, filed on Jul. 11, 2022; the entire contents of which are incorporated herein by reference.

FIELD

Embodiments described herein relate generally to a stacking apparatus, a stacking method, and a stacking system.

BACKGROUND

Systems for stacking sheets, such as sheet electrodes, planographic printing plates, or recording paper sheets, have been known.

For example, a structure including a system that sequentially stacks delivered sheets onto a stacking table, and guide members having inclined surfaces for guiding the sheets onto a collecting table has been disclosed.

However, with such conventional technology, it has been sometimes difficult to stack a plurality of sheets in a precisely aligned manner.

DETAILED DESCRIPTION

A stacking apparatus according to an embodiment includes a stacking table, a first guide member, a second guide member, and a vibrator. The stacking table includes a stacking surface on which sheets are sequentially stacked. The first guide member is provided to stand on the stacking table. The first guide member restricts position of edges in a first width direction of the sheets stacked on the stacking table. The second guide member is provided to stand on the stacking table. The second guide member restricts position of edges in a second width direction of the sheets stacked on the stacking table. The second width direction intersects with the first width direction. The vibrator is configured to apply micro-vibration to at least one of the first guide member and the second guide member.

A stacking apparatus, a stacking method, and a stacking system will now be explained in detail with reference to the accompanying drawings.

First Embodiment

Figure 1:
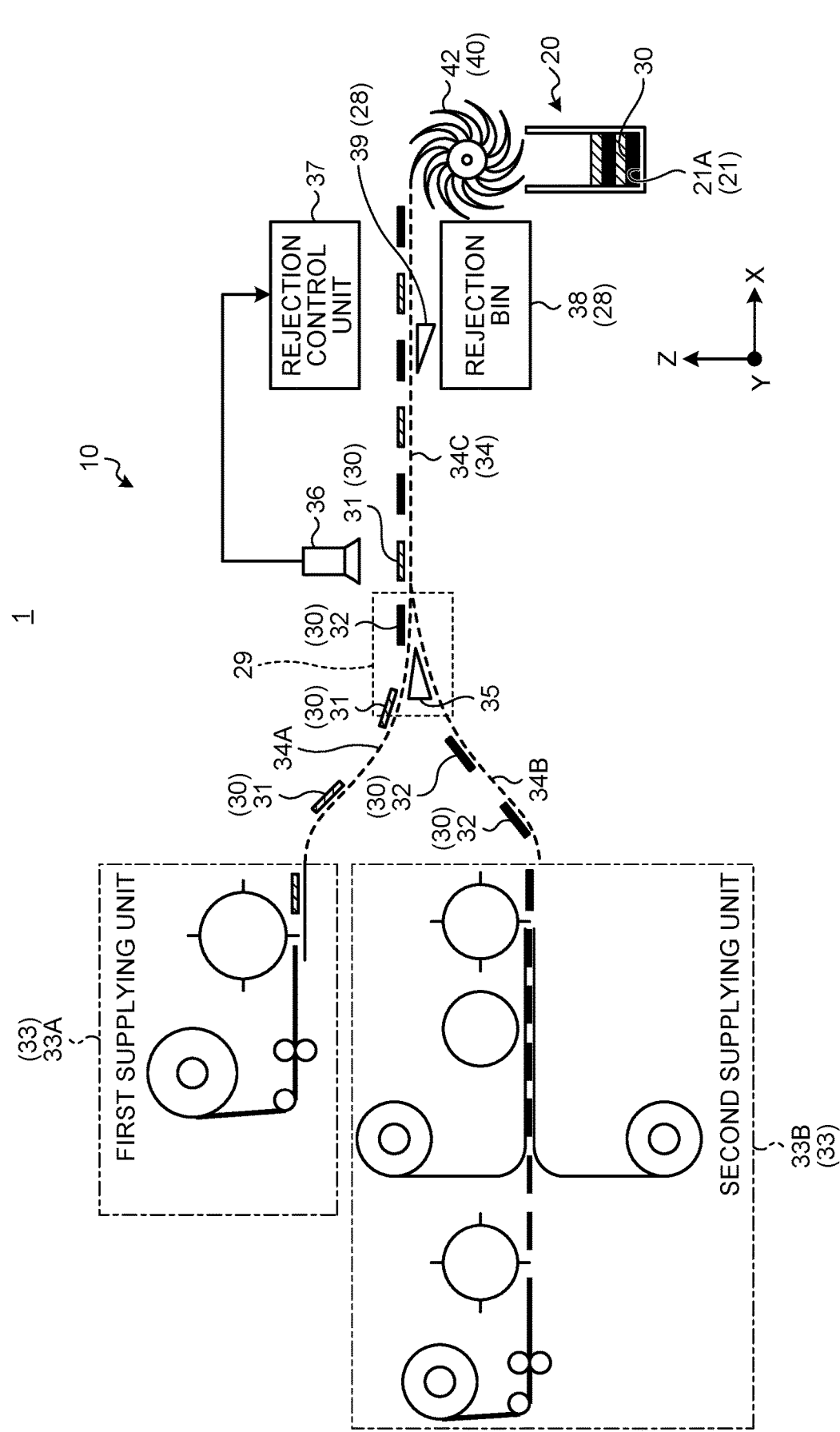
FIG. 1 is a schematic illustrating a structure of a stacking system according to an embodiment.

FIG. 1 is a schematic illustrating one example of a structure of a stacking system 1 according to this embodiment.

The stacking system 1 is a system for laying and stacking a plurality of sheets 30 sequentially.

The sheets 30 are thin film-like members that are to be stacked in the stacking system 1.

Explained in this embodiment is an example in which the sheet 30 is a member that is to be used as an electrode. Moreover, explained in this embodiment is an example in which a principal surface of the sheet 30 has a quadrilateral shape, specifically, a rectangular shape. Furthermore, explained in this embodiment is an example in which a first sheet 31 and a second sheet 32 are used as the sheets 30.

There is no limitation on the shape and the material of the sheets 30 as long as the sheets 30 are thin film-like members. Moreover, without limitation to the configuration for stacking two types of sheets 30, the stacking system 1 may also be an apparatus for stacking one type of sheets 30 or three or more types of sheets 30.

FIGS. 2A to 2D are schematics of one example of the sheet 30.

Figure 2A:
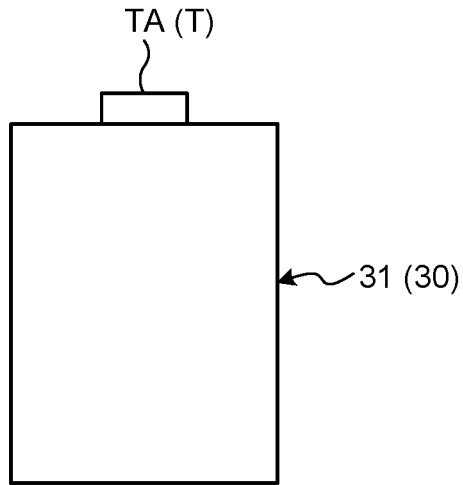
FIG. 2A is a schematic of a sheet.

FIG. 2A is a schematic of one example of the first sheet 31. The first sheet 31 is a member that makes up an electrode to be housed inside a battery. In this embodiment, the first sheet 31 will be explained as a member serving as a negative electrode, as an example. The first sheet 31 has a rectangular principal surface. Specifically, the first sheet 31 has a quadrilateral principal surface. A tab TA is provided to a principal surface of the first sheet 31. The tab TA is an example of a tab T. The first sheet 31 that is an electrode is fabricated by applying coating of active material to a front surface and a rear surface of a thin aluminum foil sheet, for example. In the aluminum foil sheet serving as the first sheet 31, an area not provided with the coating of the active material, that is, a part protruding from the area provided with the coating of the active material serves as the tab TA. In other words, the tab TA forms part of the first sheet 31. The tab TA, for example, functions as a terminal to be connected to a member outside of the first sheet 31 that is an electrode. Explained in this embodiment is an example in which the tab TA is disposed at the center of one of four sides of the quadrilateral principal surface of the first sheet 31.

Figure 2B:
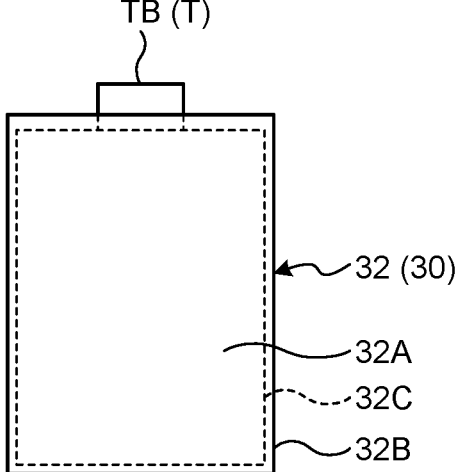
FIG. 2B is a schematic of a sheet.
Figure 2C:
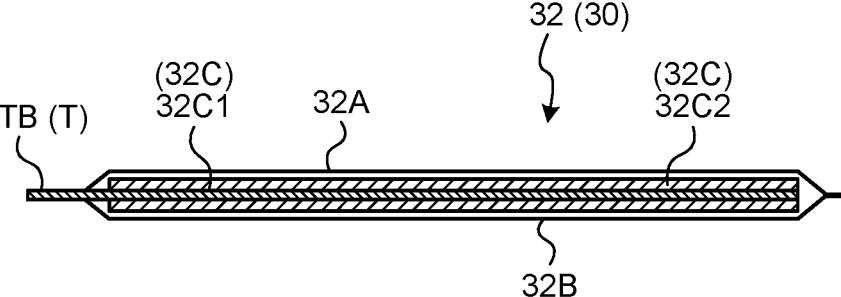
FIG. 2C is a schematic of the sheet.

FIG. 2B is a schematic of one example of the second sheet 32. FIG. 2C is a sectional view of one example of the second sheet 32.

The second sheet 32 is a member that makes up an electrode to be housed inside a battery. The second sheet 32 serves as the positive electrode or the negative electrode, the polarity of which being different from that of the electrode of the first sheet 31. In this embodiment, the second sheet 32 will be explained as a member serving as a positive electrode, as an example. The second sheet 32 has a rectangular principal surface. Specifically, the second sheet 32 has a quadrilateral principal surface. A tab TB is provided to the principal surface of the second sheet 32. The tab TB is an example of the tab T. The tab TB, for example, functions as a terminal to be connected to a member outside of the second sheet 32 that is an electrode. In this embodiment, the tab TB is explained to be disposed at the center of one of four sides of the quadrilateral principal surface of the second sheet 32, as an example.

The second sheet 32 is a lamination of a separator 32A, an electrode sheet 32C, and a separator 32B. The electrode sheet 32C is fabricated by applying coating of active material 32C2 to a front surface and a rear surface of a thin aluminum foil sheet 32C1 (see FIG. 2C). The electrode sheet 32C is interposed between the separator 32A and the separator 32B, and packed in a bag. Part of one end along the principal surface of the aluminum foil sheet 32C1 providing the electrode sheet 32C protrudes out from the separator 32A and the separator 32B, and is exposed to the outside. This protruding part functions as the tab TB. In other words, in the aluminum foil sheet 32C1 providing the electrode sheet 32C, an area not provided with the coating of the active material 32C2, that is, a part protruding from the area provided with the coating of the active material 32C2 serves as the tab TB. In other words, the tab TB forms part of the electrode sheet 32C.

Part of one end along the principal surface of the pair of separators that are the separator 32A and the separator 32B preferably protrudes in a direction in which the tab TB protrudes, in a manner covering an area including an end of the tab TB, which is the protruding part of the aluminum foil sheet 32C1, the end being an end on the side of the electrode sheet 32C. In other words, preferably, part of each of the pair of separators has a protrusion, the part being part of the portion corresponding to the tab TB, the protrusion protruding in the direction in which the tab TB protrudes, in a manner covering an area including an end of the tab TB, the end being an end on the side of a main part of the electrode sheet 32C. The protrusions that are the protruding parts of the separator 32A and the separator 32B, protruding in the direction in which the tab TB protrudes, preferably have their ends bonded to each other, the ends being those in a direction intersecting with the direction in which the tab TB protrudes.

Figure 2D:
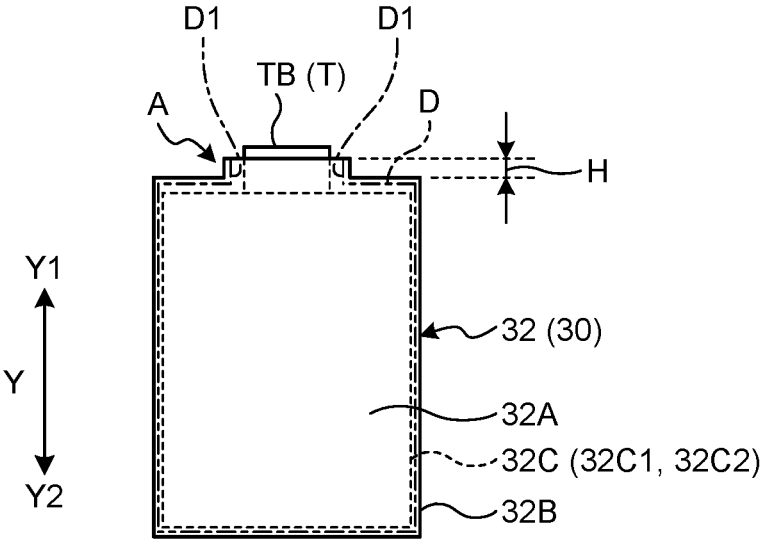
FIG. 2D is a schematic of the sheet.

FIG. 2D is a schematic of one example of the second sheet 32. For example, as illustrated in FIG. 2D, part of the area of one end of each of the separators in the pair, which are the separator 32A and the separator 32B, is provided as a protrusion A protruding in the direction in which the tab TB, which is a protrusion of the aluminum foil sheet 32C1, protrudes. The one end herein is an end extending along the principal surface of the corresponding separator in the pair, and the protrusion A is provided in a manner covering an area including one end of the tab TB, the one end being the end on the side of the main part of the electrode sheet 32C.

The end of the tab TB on the side of the main part of the electrode sheet 32C is the end of the tab TB in the direction of the arrow Y2, which is a direction opposite to the direction of the arrow Y1 in which the tab TB protrudes from the electrode sheet 32. The main part of the electrode sheet 32C is the part applied with the coating of the active material 32C2, in the aluminum foil sheet 32C1 making up the electrode sheet 32C.

A height H of the protrusions A of the pair of separators that are the separator 32A and the separator 32B in the protruding direction (the direction of the arrow Y1) may be set to any size that satisfies the following conditions, for example. To explain more in detail, the height H is set to such a length that an exposed portion of the tab TB, the exposed portion being exposed from the separator 32A and the separator 32B, has a length enough to function as a connection terminal in the protruding direction (in the direction of the arrow Y1), and the exposed portion of the tab TB is long enough not to be brought into contact with the first sheet 31 when the second sheet 32 is stacked on the first sheet 31. Specifically, the height H is preferably a few millimeters, for example.

As illustrated in FIG. 2D, the protrusions A of the separator 32A and the separator 32B protruding in the direction in which the tab TB protrudes are bonded with each other on bonded portions D1 provided on the respective ends of the protrusions A, the respective ends being those in the direction intersecting with the direction in which the tab TB protrudes (the direction of the arrow Y1). To explain more in detail, the bonded portions D between the separator 32A and the separator 32B are provided to bond the outer peripheries of the separator 32A and the separator 32B, on the outer side of the electrode sheet 32C. The bonded portions D1 bonding the protrusions A of the separator 32A and the separator 32B are provided in a manner extending in the protrusion direction (the direction of the arrow Y1) to bond the respective ends of the tab TB, the respective ends being those in the direction intersecting with the protrusion direction (the direction of the arrow Y1). It is more preferable if there is a less distance between the bonded portions D and the outer peripheries of the separator 32A and the separator 32B. It is more preferable if there is a less gap between the bonded portions D and the outer periphery of the electrode sheet 32C placed between the separator 32A and the separator 32B.

Part of the area of one end of each of the separators provided as a pair, the separators being the separator 32A and the separator 32B, and the one end being an end extending along the principal surface of the corresponding separator in the pair, protrudes in the direction in which the tab TB that is a protrusion of the aluminum foil sheet 32C1 protrudes, in a manner covering an area including one end of the tab TB, the one end being the end on the side of the main part of the electrode sheet 32C. Therefore, the tab TB of the second sheet 32 and the tab TA of the first sheet 31 are less likely to be brought into contact with each other when the second sheet 32 is stacked on the first sheet 31, and short circuit can be prevented.

The protrusions A of the separator 32A and the separator 32B, the protrusions A being the portions protruding in the protruding direction of the tab TB, are bonded at bonded portions D1 that are on both ends of the separator 32A and the separator 32B in the direction intersecting with the protruding direction of the tab TB. Therefore, the protrusions A of the separator 32A and the separator 32B are prevented from becoming folded up, and exposing the entire area of the tabs TB, while the second sheet 32 is being conveyed. In this manner, it becomes less likely for the second sheet 32 and the first sheet 31 to become stacked with the entire area of the tab TB exposed. Therefore, even when the sheets 30 are stacked precisely, and even when the aluminum foil sheet of the first sheet 31 has some area exposed from the active material, the tab TA of the first sheet 31 is less likely to be brought into contact with the tab TB of the second sheet 32, and short circuit can be prevented.

In the following description, when the first sheet 31 and the second sheet 32 are explained by collectively referring thereto, the first sheet 31 and the second sheet 32 will be simply referred to as sheets 30. When the tab TA and the tab TB are explained by collectively referring thereto, the tabs TA and TB will be simply referred as tabs T.

Returning to FIG. 1, the explanation will now be continued.

In this embodiment, the stacking system 1 stacks the first sheet 31 and the second sheet 32 alternatingly.

Without limitation to the alternating order, the stacking system 1 may stack the first sheet 31 and the second sheet 32 in any order. For example, the stacking system 1 may repeat a pattern of stacking two sheets of the first sheet 31 in a sequence, and then stacking one sheet of the second sheet 32. Alternatively, the stacking system 1 may stack the sheets 30 of three or more types in a predetermined order.

The stacking system 1 includes a guiding apparatus 10 and a stacking apparatus 20.

The guiding apparatus 10 guides the sheets 30 sequentially onto a stacking table 21 of the stacking apparatus 20. The stacking apparatus 20 sequentially stacks the sheets 30 guided from the guiding apparatus 10 onto a stacking surface 21A of the stacking table 21.

To begin with, the guiding apparatus 10 will be explained.

The guiding apparatus 10 includes a supplying unit 33, a conveying mechanism 34, a guide 35, a supplying mechanism 40, a detecting unit 36, a rejection control unit 37, and a rejecting unit 28.

The supplying unit 33 is a mechanism for supplying sheets 30 sequentially to the conveying mechanism 34. The conveying mechanism 34 conveys the sheets 30 supplied from the supplying unit 33 toward the stacking apparatus 20. In this embodiment, an example in which the conveying mechanism 34 conveys the sheet 30 along an X-axis direction that is the conveying direction will be explained. In FIG. 1, a Z-axis direction extends in parallel with the vertical direction. A Y-axis direction extends orthogonally to the Z-axis direction and the X-axis direction.

In this embodiment, the supplying unit 33 includes a first supplying unit 33A and a second supplying unit 33B. The conveying mechanism 34 includes a first preceding-stage conveyor unit 34A, a second preceding-stage conveyor unit 34B, and a subsequent-stage conveyor unit 34C.

The first supplying unit 33A sequentially outputs the first sheets 31 one by one to the first preceding-stage conveyor unit 34A. For example, the first supplying unit 33A produces a first sheet 31 by pulling out a long electrode material wound in a roll-like shape, and cutting the material using a cutter. The first supplying unit 33A then sequentially outputs the first sheets 31 one by one to the first preceding-stage conveyor unit 34A.

The second supplying unit 33B sequentially outputs the second sheets 32 one by one to the second preceding-stage conveyor unit 34B. For example, the second supplying unit 33B produces an electrode sheet 32C having a rectangular shape, by pulling out a long electrode material wound in a roll-like shape, and cutting the material using a cutter. The second supplying unit 33B then pulls out two long separator materials wound in rolls, respectively, and places the electrode sheet 32C between the two separators 32A and 32B having been pulled out. The second supplying unit 33B then bonds parts of the respective separator 32A and separator 32B enveloping the electrode sheet 32C, except for the tab T of the electrode sheet 32C. The second supplying unit 33B then cut with the cutter the separator 32A and the separator 32B, which are joined together with the electrode sheet 32C enveloped, to produce the second sheet 32. The second supplying unit 33B sequentially supplies, one by one, the second sheets 32 that have been produced to the second preceding-stage conveyor unit 34B.

The first preceding-stage conveyor unit 34A conveys the first sheet 31 supplied from the first supplying unit 33A toward a merging unit 29 provided on the conveying path. The second preceding-stage conveyor unit 34B conveys the second sheet 32 supplied from the second supplying unit 33B toward the merging unit 29.

The merging unit 29 is a section where the two conveyance paths of the first preceding-stage conveyor unit 34A and the second preceding-stage conveyor unit 34B are merged, together forming one conveyance path. The first preceding-stage conveyor unit 34A and the second preceding-stage conveyor unit 34B are merged along the guide 35, and connected to the subsequent-stage conveyor unit 34C that is one conveying path. Therefore, the first sheet 31 conveyed by the first preceding-stage conveyor unit 34A is guided to the subsequent-stage conveyor unit 34C via the merging unit 29. The second sheet 32 conveyed by the second preceding-stage conveyor unit 34B is also guided to the subsequent-stage conveyor unit 34C via the merging unit 29.

The subsequent-stage conveyor unit 34C receives the first sheet 31 conveyed by the first preceding-stage conveyor unit 34A and the second sheet 32 conveyed by the second preceding-stage conveyor unit 34B sequentially from the merging unit 29, and conveys the first sheet 31 and the second sheet 32 in the conveying direction, in the order in which the first sheet 31 and the second sheet 32 are received.

The supplying mechanism 40 collects the sheets 30 that are the first sheet 31 and the second sheet 32 received from the subsequent-stage conveyor unit 34C, one after another, and supplies the collected sheets 30 to the stacking apparatus 20, in the order in which the sheets 30 are collected. As a result, the sheets 30 are sequentially stacked in the Z-axis direction, on the stacking surface 21A of the stacking table 21 provided in the stacking apparatus 20. The supplying mechanism 40 and the stacking apparatus 20 will now be explained in detail.

A detecting unit 36 detects conditions of the sheets 30 being conveyed by the conveying mechanism 34. The conditions of the sheets 30 include scratches, chips, bends, stains, types, inclinations thereof in the conveying direction (X-axis direction), the amount of skew in the Y-axis direction, the timing of passage, and the intervals between the sheets 30 being conveyed.

Based on the detection results of the detecting unit 36, the rejection control unit 37 detects a sheet 30 having resulted in a detection result not meeting a predetermined condition as defective. The rejecting unit 28 removes the sheet 30 detected as defective by the rejection control unit 37, from the conveying path of the conveying mechanism 34. Therefore, normal sheets 30 not having been detected as defective are sequentially conveyed to the supplying mechanism 40.

To explain more in detail, the rejecting unit 28 includes a switching gate 39 and a rejection bin 38. The rejection bin 38 is a box-like member that stores therein the sheets 30 detected as defective. The switching gate 39 is a member for switching the sheets 30 being fed from the subsequent-stage conveyor unit 34C from a first route for guiding the sheets 30 along the conveying path toward the supplying mechanism 40, to a second route for guiding the sheets 30 into the rejection bin 38. For example, if the principal surface of the sheet 30 in the conveying direction (X-axis direction) of the switching gate 39 is disposed substantially in parallel with the conveying direction of the subsequent-stage conveyor unit 34C (the direction of the arrow X), the switching gate 39 guides the sheet 30 that is being conveyed by the subsequent-stage conveyor unit 34C along the conveying path, toward the supplying mechanism 40. If the principal surface of the switching gate 39 is skewed with respect to the conveying direction of the subsequent-stage conveyor unit 34C, the switching gate 39 guides the sheet 30 that is being conveyed by the subsequent-stage conveyor unit 34C into the rejection bin 38. A drive mechanism, not illustrated, included in the rejecting unit 28 switches an angle by which the switching gate 39 is disposed based on the detection result of the rejection control unit 37. As a result, the sheet 30 detected by the rejection control unit 37 as defective is removed from the conveying path of the conveying mechanism 34, and is guided into the rejection bin 38.

It is assumed herein that the stacking system 1 conveys the sheets via the conveying mechanism 34 by arranging the first sheet 31 and the second sheet 32, which together make up a pair of electrodes (a negative electrode and a positive electrode), alternatingly. It is also assumed herein that the rejection control unit 37 detects the first sheet 31 as defective. In such a case, the rejecting unit 28 controls the switching gate 39 to remove both the first sheet 31 detected as defective and the second sheet 32 paired therewith and being conveyed subsequently thereto from the conveying path, and guide the sheets 30 into the rejection bin 38. In the same manner, if the second sheet 32 is detected as defective, the rejecting unit 28 controls the switching gate 39 to remove the second sheet 32 detected as defective, as well as the first sheet 31 paired therewith and being conveyed subsequently the second sheet 32, from the conveying path, and guide the sheets to the rejection bin 38.

The supplying unit 33 adjusts the timing for supplying the first sheet 31 and the second unit 32 such that the first sheet 31 and the second sheet 32 arrive at the merging unit 29 in a predetermined order. Therefore, the first sheet 31 and the second sheet 32 are conveyed one after another to the supplying mechanism 40 positioned downstream of the conveying path, in the predetermined order.

The supplying mechanism 40 sequentially collects the sheets 30 being conveyed in the predetermined order, and supplies the sheets 30 having been collected to the stacking apparatus 20, sequentially in the order collected.

The supplying mechanism 40 may be any mechanism that collects the sheets 30 being conveyed in the order being conveyed, and supplies the sheets 30 to the stacking apparatus 20 sequentially in the order collected. For example, the supplying mechanism 40 may include an impeller 42 and a restricting member 43.

Figure 3:
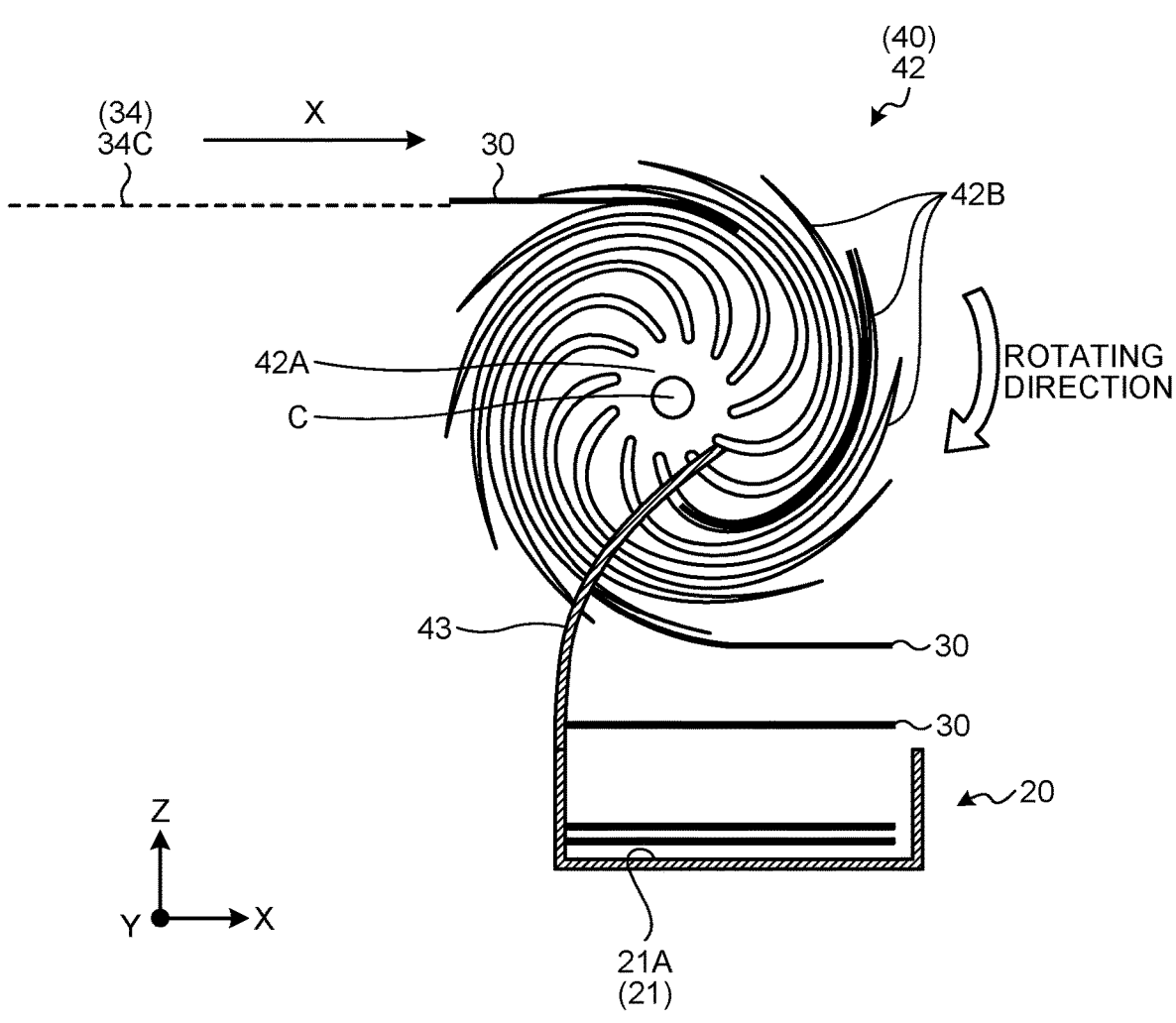
FIG. 3 is a schematic of a structure of an impeller.

FIG. 3 is a schematic illustrating one example of structures of the impeller 42 and the restricting member 43. The impeller 42 and the restricting member 43 are examples of the supplying mechanism 40. The impeller 42 and the restricting member 43 supply the sheets 30 fed from the conveying mechanism 34, which conveys the sheets 30, to the stacking table 21 of the stacking apparatus 20.

The impeller 42 includes a plurality of vanes 42B.

Each of the vanes 42B has a thin plate-like shape. One ends of the vanes 42B are connected to one another at a center 42A of the impeller 42. In other words, the vanes 42B are integrated via the center 42A of the impeller 42. The vanes 42B are formed by cutting curved grooves or incisions into a disk-shaped member, from a circumferential side thereof toward the center of the circle, at predetermined intervals along the circumferential direction. The distance between two circumferentially adjacent vanes 42B is adjusted to a size allowing one sheet 30 to be inserted between them. The tip of the other end of each of the vanes 42B has a thin and pointed cross section. A circular hole is provided at the center 42A of the impeller 42. A cylindrical rotary shaft C that is elongated in the Y-axis direction is inserted into the hole at the center 42A. A plurality of disk-shaped impellers 42 are inserted into the rotary shaft C along the direction in which the rotary shaft C extends.

As the rotary shaft C rotates, the impellers 42 supported by the rotary shaft C rotates about the rotary shaft C, and the rotation of the impellers 42 causes the vanes 42B to rotate.

The impellers 42 are adjusted to synchronize with the timing at which the sheets 30 enters the impellers 42 such that each of the sheets 30 is inserted between a pair of the vanes 42B. The sheet 30 arriving at a downstream end of the subsequent-stage conveyor unit 34C in the conveying direction (X-axis direction) is inserted into the space between the two vanes 42B of the rotating impeller 42. In other words, the sheets 30 arriving at the downstream end of the subsequent-stage conveyor unit 34C in the conveying direction are sequentially inserted into the respective spaces between different pairs of vanes 42B in the rotating impellers 42. The sheets 30 inserted into the respective spaces between the pairs of vanes 42B are held by the frictional force between the vanes 42B, become decelerated, and rotate and reverse as the rotary shaft C rotates.

The restricting member 43 is a member for releasing the sheet 30 held between the two adjacent vanes 42B at a release position of the stacking table 21 in the stacking apparatus 20. The release position is a position inside the space above the stacking apparatus 20. To explain more in detail, the release position is a position inside a space that is a projection of the stacking table 21 in the stacking apparatus 20, the projection being projecting in a direction reversal of the gravitational direction in the Z-axis direction, the position being separated from the highest position up to where the sheets 30 can be stacked in the stacking apparatus 20, being separated in the direction moving away from the stacking table 21.

The restricting member 43 restricts the sheet 30 held between the two adjacent vanes 42B from moving any further than the release position, in the rotating direction of the rotary shaft C. By restricting the sheet 30 from moving any further than the release position, the sheet 30 held between the two adjacent vanes 42B is released out of the space between the two adjacent vanes 42B.

The restricting member 43 also guides the sheet 30 released to the outside from the space between the two adjacent vanes 42B, such that the sheet 30 falls into the space inside the stacking apparatus 20. As a result, the sheets 30 supplied from the impellers 42 are sequentially stacked in the Z-axis direction, on the stacking surface 21A of the stacking table 21 in the stacking apparatus 20.

In the manner described above, the impellers 42 collect the conveyed sheet 30 between the vanes 42B at the end of the conveyor of the conveying mechanism 34, and rotate the collected sheet 30 while holding the sheet between the vanes 42B to carry the collected sheet 30 up to the release position above the stacking table 21. The restricting member 43 causes the impellers 42 to release the sheet 30 held between the vanes 42B at the release position so as to fall into the stacking table 21. With these operations, the impeller 42 supplies the sheets 30 sequentially onto the stacking table 21.

Returning to FIG. 1, the explanation will now be continued.

The stacking apparatus 20 will now be explained. The stacking apparatus 20 is an apparatus that sequentially stacks the sheets 30 conveyed by the conveying mechanism 34 and supplied by the supplying mechanism 40 that are included in the guiding apparatus 10. In this embodiment, the stacking apparatus 20 stacks the sheets by piling up the sheets 30 sequentially in the direction reversal of the gravitational direction, using the direction reversal of the gravitational direction in the Z-axis direction as the stacking direction.

Figure 4A:
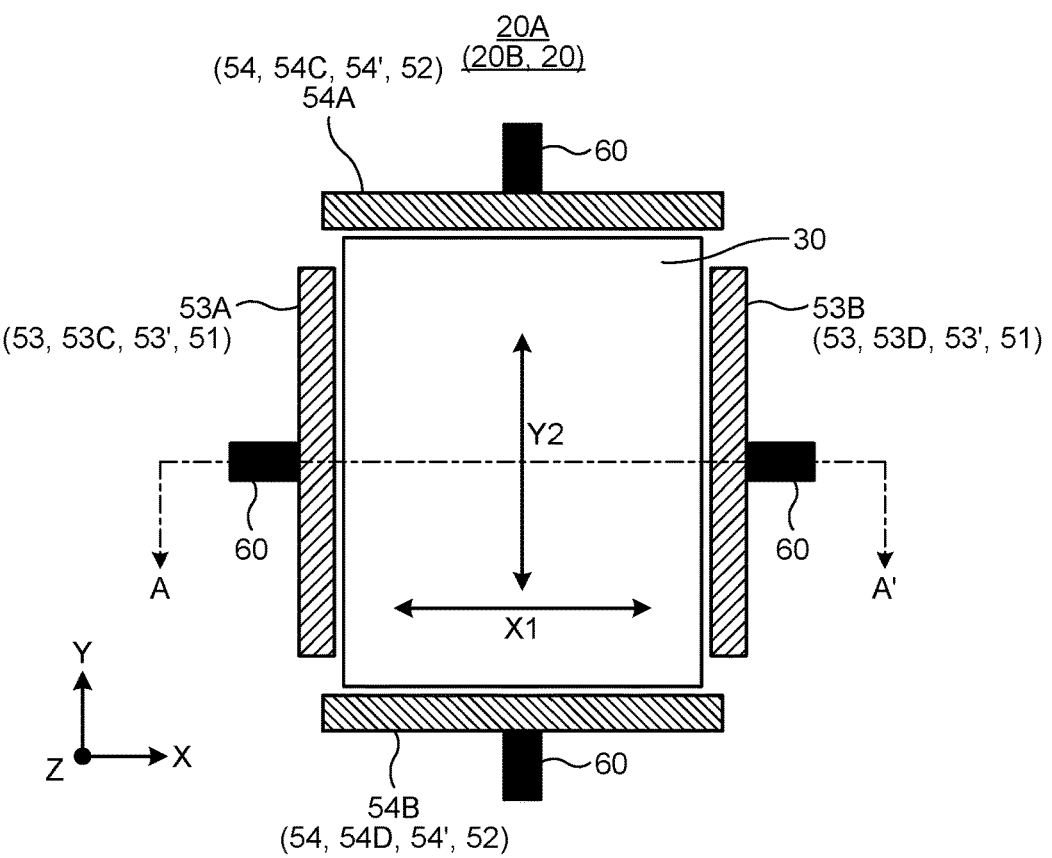
FIG. 4A is a schematic of a stacking apparatus.
Figure 4B:
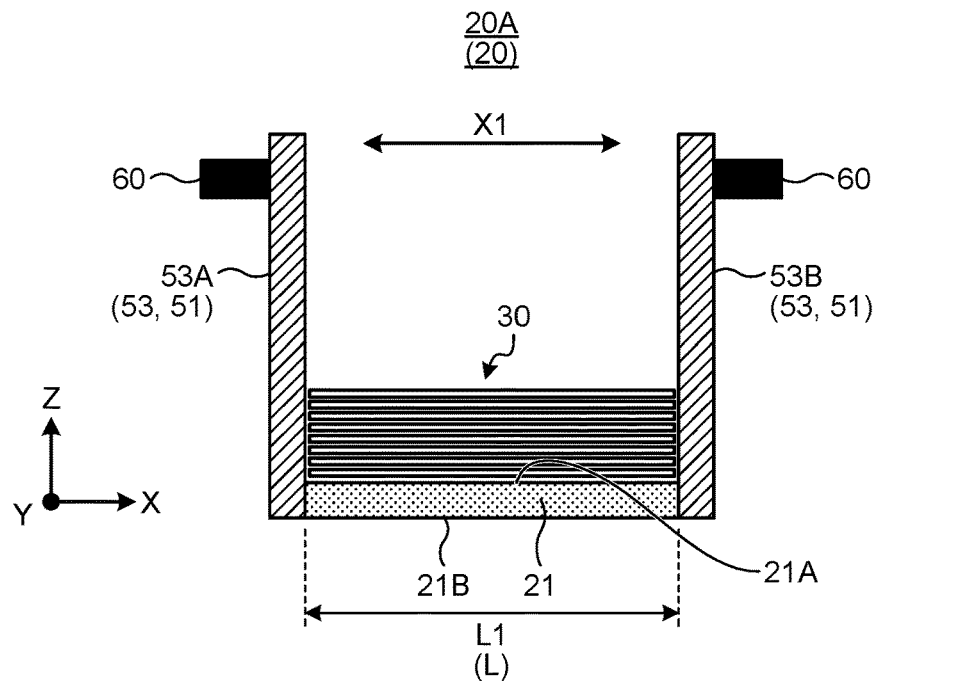
FIG. 4B is a schematic of the stacking apparatus.

FIGS. 4A and 4B are schematics of an example of a stacking apparatus 20A. The stacking apparatus 20A is an example of the stacking apparatus 20.

FIG. 4A is a plan view of the stacking apparatus 20A. FIG. 4B is a sectional view of the stacking apparatus 20A illustrated in FIG. 4A taken along the line A-A'.

The stacking apparatus 20A includes the stacking table 21, first guide members 51, second guide members 52, and vibrators 60.

The stacking table 21 is a plate-like member that serves as the bottom of the stacking apparatus 20. The sheets 30 are sequentially stacked on a stacking surface 21A of the stacking table 21. The stacking surface 21A is a surface of the stacking table 21, the surface facing the direction reversal of the gravitational direction. In other words, the stacking surface 21A is the surface facing the principal surface of the sheet 30 stacked on the stacking table 21. In this embodiment, the stacking table 21 and the stacking surface 21A of the stacking table 21 are positioned substantially in parallel with an XY plane extending along the X axis and the Y axis.

The shape of the stacking surface 21A of the stacking table 21 is substantially the same as that of the sheet 30. As mentioned above, in this embodiment, the principal surface of sheet 30 has a quadrilateral shape. For this reason, explained herein is an example in which the stacking surface 21A has a quadrilateral shape, which is the shape same as that of the principal surface of the sheet 30. The size of the stacking surface 21A may be the same as the principal surface of the sheet 30, or any size that is an enlargement of the size of the principal surface of the sheet 30.

The first guide member 51 is a plate-shaped member provided to stand on the stacking table 21. In this embodiment, the first guide members 51 are disposed in parallel with the Z-axis direction so as to stand on the stacking table 21 extending in parallel with the XY plane.

The first guide members 51 are members for restricting the positions of edges in a first width direction X1 of the sheets 30 stacked on the stacking table 21. Restricting of positions of edges of the sheets 30 refers to aligning of those edges.

The first width direction X1 may be any direction along the principal surface of the stacked sheets 30. To explain more in detail, in this embodiment, the first width direction X1 may be any direction extending along the XY plane. The first width direction X1 or a second width direction Y2, which will be described later, preferably extends in parallel with the X-axis direction that is the direction in which the sheets 30 are conveyed. Explained in this embodiment is an example which the first width direction X1 extends in parallel with the X-axis direction, i.e., in parallel with the direction in which the sheets 30 are conveyed. Explained in this embodiment is an example in which the second width direction Y2 extends in parallel with the Y-axis direction, i.e., in parallel with a direction intersecting with the direction in which the sheets 30 are conveyed.

There is no limitation on the shape and the material of the first guide members 51. Explained in this embodiment is an example in which each of the first guide members 51 is a plate-shaped member a plate surface of which extends in parallel with the Z-axis direction. The surface of the first guide members 51, the surface facing the sheets 30 to be stacked, preferably has a low roughness and low friction.

In this embodiment, the first guide members 51 include a pair of third guide members 53 that are disposed with a distance between them in the first width direction X1. To explain more in detail, the first guide member 51 includes a pair of third guide members 53 containing a third guide member 53A and a third guide member 53B.

Preferably, a facing distance between the facing third guide member 53A and third guide member 53B is set to a first distance L1. The facing distance between the third guide member 53A and the third guide member 53B is a distance between the third guide member 53A and the third guide member 53B in the first width direction X1.

The first distance L1 between the third guide member 53A and the third guide member 53B is within a range equal to or more than a maximum width of a pile of the plurality of sheets 30 stacked on the stacking table 21 in the direction in which the third guide member 53A and the third guide member 53B face each other (in the first width direction X1), and equal to or less than an added width that is a maximum permissible error added to the maximum width.

Positions of edges of the respective sheets 30 stacked on the stacking table 21, the positions being those in the X-axis direction and the edges being those in the first width direction X1, may vary depending on factors such as the environment where the sheets 30 are stacked on the stacking table 21. Therefore, preferably, a minimum first distance L1 between the third guide member 53A and the third guide member 53B is set to the maximum width of a pile of a plurality of sheets 30 stacked on the stacking table 21, the maximum width being a width in the first width direction X1. The maximum width may be measured and set using the stacking system 1 in advance.

The maximum first distance L1 between the third guide member 53A and the third guide member 53B is set to the added width that is a maximum permissible error added to the maximum width. This permissible error is expressed as a sum of a distance between the sheet 30 and the third guide member 53A, and a distance between the sheet and the third guide member 53B, in the first width direction X1. As the permissible error, a minimum width that allows the stacking apparatus 20 to stack the sheets 30 on the stacking table 21 while ensuring the alignment of the sheets 30 may be set in advance, as a sum of these distances in the first width direction X1.

It is now assumed that the maximum permissible error is 0.2 mm, as an example. Under this assumption, the first distance L1 between the third guide member 53A and the third guide member 53B may be set to a distance 0.2 mm plus the maximum width of a pile of the stacked sheets 30 in the first width direction X1.

The second guide members 52 are plate-like members each being provided to stand on the stacking table 21. In this embodiment, the second guide members 52 are disposed in parallel with the Z-axis direction so as to stand on the stacking table 21 disposed in parallel with the XY plane.

The second guide members 52 are members for restricting the positions of edges in the second width direction Y2 of the sheets 30 stacked on the stacking table 21.

The second width direction Y2 may be any direction extending along the principal surface of the stacked sheets 30, and intersecting with the first width direction X1. As mentioned earlier, explained in this embodiment is an example in which the second width direction Y2 extends in parallel with the Y-axis direction, i.e., a direction intersecting with the direction in which the sheets 30 are conveyed.

There is no limitation on the shape and the material of the second guide members 52. Explained in this embodiment is an example in which each of the second guide members 52 is a plate-shaped member whose surface extends in parallel with the Z-axis direction. The surface of the second guide member 52, the surface facing the sheets 30 to be stacked, preferably has a low roughness and low friction.

In this embodiment, the second guide members 52 include a pair of fourth guide members 54 that are disposed with a distance between them in the second width direction Y2. To explain more in detail, the second guide members 52 include a pair of fourth guide members 54 containing a fourth guide member 54A and a fourth guide member 54B.

Preferably, a facing distance between the facing fourth guide member 54A and fourth guide member 54B is set to the first distance L1. The facing distance between the fourth guide member 54A and fourth guide member 54B is a distance between the fourth guide member 54A and the fourth guide member 54B in the second width direction Y2.

The first distance L1 between the fourth guide member 54A and the fourth guide member 54B is equivalent to the first distance L1 between the third guide member 53A and the third guide member 53B, but in the second width direction Y2.

In other words, the first distance L1 between the fourth guide member 54A and the fourth guide member 54B is within a range equal to or more than a maximum width of a pile of the plurality of sheets 30 stacked on the stacking table 21 in the direction in which the fourth guide member 54A and the fourth guide member 54B face each other (in the second width direction Y2), and equal to or less than an added width that is a maximum permissible error added to the maximum width.

Positions of edges of the respective sheets 30 stacked on the stacking table 21, the positions being those in the Y-axis direction and the edges being those in the second width directions Y2, may vary depending on factors such as the environment where the sheets 30 are stacked on the stacking table 21, in the same manner as for the first width directions X1. Therefore, preferably, a minimum first distance L1 between the fourth guide member 54A and the fourth guide member 54B is set to the maximum width of the pile of a plurality of sheets 30 stacked on the stacking table 21 in the second width direction Y2. The maximum width may be measured and set using the stacking system 1 in advance.

The maximum first distance L1 between the fourth guide member 54A and the fourth guide member 54B is set to the added width that is a maximum permissible error added to the maximum width. This permissible error is expressed as a sum of a distance between the sheet 30 and the fourth guide member 54A, and a distance between the sheet 30 and the fourth guide member 54B, in the second width direction Y2. As the permissible error, a minimum width that allows the stacking apparatus 20 to stack the sheets 30 on the stacking table 21 while ensuring the alignment of the sheets 30 may be set in advance, as a sum of these distances in the second width direction Y2.

It is now assumed that the maximum permissible error is 0.2 mm, as an example. Under this assumption, the first distance L1 between the fourth guide member 54A and the fourth guide member 54B may be set to a distance 0.2 mm plus the maximum width of a pile of the stacked sheets 30 in the second width direction Y2.

The vibrators 60 are mechanisms for applying micro-vibration to at least one of the first guide members 51 and the second guide members 52.

The micro-vibration refers to vibration capable of reducing the frictional force between adjacent sheets 30 stacked on the stacking table 21. In other words, the micro-vibration is vibration capable of reducing the frictional force between adjacent sheets 30 in the direction in which the sheets 30 are stacked on the stacking table 21 (the Z-axis direction). The micro-vibration is, for example, vibration whose amplitude is ±10 or smaller, and vibration frequency is 50 Hz or higher. As long as having a level sufficient to reduce the frictional force, the micro-vibration may be adjusted in advance in accordance with, for example, the type of sheets 30 to be stacked.

FIG. 4A illustrates, as an example, an embodiment in which the vibrator 60 is provided on each of the first guide members 51 and the second guide members 52. To be more in detail, FIG. 4A illustrates, as an example, an embodiment in which the vibrator 60 is provided to each one of the third guide member 53A and the third guide member 53B that are the first guide members 51, and the fourth guide member 54A and the fourth guide member 54B that are the second guide members 52.

However, the vibrator 60 only needs to be a mechanism that makes micro-vibration to any one or both of at least one of the third guide members 53 provided as a pair and at least one of the fourth guide members 54 provided as a pair. For this purpose, it is sufficient if the vibrator 60 is provided to at least one of the third guide member 53A, the third guide member 53B, the fourth guide member 54A, and the fourth guide member 54B. To be more in detail, the vibrator 60 only needs to be a mechanism that applies micro-vibration to at least one of the third guide member 53A, the third guide member 53B, the fourth guide member 54A, and the fourth guide member 54B.

Preferably, the vibrators 60 are provided to at least one of the third guide member 53A and the third guide member 53B, and the fourth guide member 54A and the fourth guide member 54B. The alignment precision of the sheets 30 is improved by applying micro-vibration to the sheets 30 from at least one of the opposing sides in the first width direction X1 and the opposing sides in the second width direction Y2. The sheets 30 having been supplied to the stacking apparatus 20A fall and are aligned, without getting caught on at least one of the first guide members 51 and the second guide members 52. Therefore, the stacking apparatus 20A can stack the sheets 30 efficiently and precisely.

It is more preferable if the vibrators 60 are provided to a larger number out of the third guide member 53A, the third guide member 53B, the fourth guide member 54A, and the fourth guide member 54B. By configuring the system with the vibrators provided to a larger number of guide members, micro-vibration can be applied more efficiently to the sheets 30 stacked on the stacking table 21.

Another possible configuration includes two or more vibrators 60 disposed on at least one of the third guide member 53A, the third guide member 53B, the fourth guide member 54A, and the fourth guide member 54B.

The vibrator 60 only needs to be a mechanism that applies micro-vibration to at least one of the third guide member 53A, the third guide member 53B, the fourth guide member 54A, and the fourth guide member 54B, without limitation to the position where the vibrators 60 are disposed. For example, the vibrator 60 are preferably disposed at positions where the micro-vibration can be applied to the entire areas of the third guide member 53A, the third guide member 53B, the fourth guide member 54A, and the fourth guide member 54B.

For example, preferably, the vibrators 60 are disposed on the third guide member 53A and the third guide member 53B, respectively, and disposed at the center in the direction along which the third guide member 53A and the third guide member 53B are provided to stand (namely, in the Z-axis direction) or at positions further away from the stacking table 21 than the center. The vibrator 60 is preferably disposed at the center of each of the third guide members 53A and the third guide member 53B in the direction (the second width direction Y2) orthogonal to the facing direction (the first width direction X1).

In the same manner, the vibrators 60 are preferably disposed on the fourth guide member 54A and the fourth guide member 54B, respectively, or at the center in the direction along which the fourth guide member 54A and the fourth guide member 54B are provided to stand (namely, in the Z-axis direction) or at positions further away from the stacking table 21 than the center. The vibrator 60 is preferably disposed at the center of each of the fourth guide members 54A and the fourth guide member 54B in the direction (the second width direction X1) orthogonal to the facing direction (the first width direction Y2).

The vibrators 60 may be any mechanism capable of applying micro-vibration to at least one of the first guide members 51 and the second guide members 52, and there is no limitation on the configuration thereof.

For example, an eccentric rotating mass (ERM) vibrating mechanism may be used as the vibrator 60. To explain more in detail, it is possible to use, as the vibrator 60, a vibrating mechanism in which a motor body is vibrated by the rotation of an eccentric weight whose center of gravity is displaced with respect to the axis of rotation.

As another example, a linear resonant actuator (LRA) vibrating mechanism may be used as the vibrator 60. To explain more in detail, it is possible to use a vibrating mechanism that drives a mover at a resonant frequency, as the vibrator 60.

As still another example, a mechanism that converts the rotation of a motor into micro-vibration via a combination of a rack and a pinion, and gears may be also used as the vibrator 60. To explain more in detail, it is possible to use a vibrating mechanism that increases the speed of the rotation of a motor, and that converts the rotational motion into a linear reciprocating motion using a rack and pinion may be used as the vibrator 60. By adjusting the amplitude and the reciprocating motion of such a vibrating mechanism, the vibrating mechanism may be used to generate micro-vibration.

Each of the first guide members 51 and the second guide members 52 is adjusted in advance, to a position, a size, and a shape that will not cause any interference with the other when micro-vibration is applied to the first guide member 51 and the second guide member 52 adjacent thereto. In the configuration illustrated in FIG. 4A, the position, the size, and the shape of the fourth guide member 54A and the third guide member 53B are adjusted in advance so as not to interfere with each other. Therefore, during a period in which at least one of the first guide members 51 and the second guide members 52 micro-vibrate, it is possible to prevent the adjacent first guide member 51 and second guide member 52 from being brought into contact with each other, and from interfering with each other, to cause an interference that restricts the micro-vibration of the guide members.

In the stacking apparatus 20A according to this embodiment, when the power is supplied to the stacking system 1, and the guiding apparatus 10 starts feeding the sheets 30 and driving the supplying mechanism 40, the vibrators 60 start micro-vibrating. In other words, in the stacking apparatus 20A according to this embodiment, the vibrator 60 starts micro-vibrating even before the sheets 30 start being supplied and stacked onto the stacking table 21. The vibrator 60 then continues to micro-vibrate during a period in which the sheets 30 are being stacked on the stacking table 21.

This stacking period includes at least a period from when the supplying mechanism 40 starts supplying the sheet 30 to the stacking apparatus 20 until when the last sheet 30 having been supplied to the stacking apparatus 20 is placed on the sheets having been already stacked. The stacking period may be a period from when the supplying mechanism 40 starts supplying the sheets 30 to the stacking apparatus 20, to when a predetermined time elapses from when the final sheet 30 having been supplied is placed on the sheets 30 having been already stacked.

As mentioned earlier, the micro-vibration refers to vibration for reducing the friction between the stacked sheets 30. Therefore, the sheets 30 sequentially supplied from the supplying mechanism 40 onto the stacking table 21 in the stacking apparatus have their positions in the first width direction X1 and the second width direction Y2 restricted by the first guide members 51 and the second guide members 52, respectively, and the sheets 30 are sequentially stacked with their frictional force reduced by the micro-vibration applied via at least one of the first guide members 51 and the second guide members 52.

Therefore, the stacking apparatus 20A according to this embodiment can stack the sheets 30 in a precisely aligned manner.

As explained above, the stacking apparatus 20 in this embodiment includes the stacking table 21, the first guide members 51, the second guide members 52, and the vibrators 60. The sheets 30 are stacked sequentially on the stacking surface 21A of the stacking table 21. The first guide members 51 are members provided to stand on the stacking table 21, and restricting the positions of the edges of the respective sheets 30 that are stacked on the stacking table 21, the edges being those in the first width direction X1. The second guide members 52 are members provided to stand on the stacking table 21, and restricting the positions of the edges of the respective sheets 30 that are stacked on the stacking table 21, the edges being those in the second width direction Y2 intersecting with the first width direction X1. The vibrator 60 micro-vibrates at least the first guide members 51 or the second guide members 52.

In the manner described above, in the stacking apparatus 20 according to this embodiment, the vibrator 60 applies micro-vibration to at least one of the first guide members 51 and the second guide members 52 that are provided to stand on the stacking table 21.

In other words, the stacking apparatus 20 according to this embodiment, the micro-vibration generated by the vibrator 60 is propagated to the sheets 30 via at least one of the first guide members 51 and the second guide members 52. The micro-vibration propagated to the sheets 30 reduces the frictional force between the sheets 30 supplied into the stacking table 21. The sheets 30 are sequentially stacked on the stacking surface 21A of the stacking table 21, with their friction reduced, while being guided by the first guide members 51 and the second guide members 52.

Therefore, the sheets 30 are sequentially stacked on the stacking table 21 while being aligned by the first guide members 51 and the second guide members 52.

Therefore, the stacking apparatus 20 according to the embodiment can stack the sheets 30 in a precisely aligned manner.

In the stacking apparatus 20 according to the embodiment, the vibrator 60 micro-vibrates at least one of the first guide members 51 and the second guide members 52. Therefore, it is possible to suppress damages of the sheets 30, compared with a conventional configuration in which the sheets 30 are aligned by directly striking the side faces of the stacked sheets 30.

In the stacking apparatus 20 according to this embodiment, the vibrator 60 starts micro-vibrating at least one of the first guide member 51 and the second guide member 52 even before the sheets 30 are stacked on the stacking table 21. The vibrator continues the micro-vibration during the stacking period in which the sheets 30 are sequentially stacked on the stacking table 21.

Therefore, compared with a configuration in which the vibration is applied to the sheets 30 after the sheets 30 are stacked, the stacking apparatus 20 according to this embodiment can suppress rubbing between the sheets 30, and the sheets 30 are less likely to get caught by the guide members during the process of being stacked. Therefore, in addition to the advantageous effects described above, the stacking apparatus 20 according to this embodiment can suppress damages of the sheets 30 in the process of being stacked.

In the stacking apparatus 20 according to this embodiment, the facing distance between at least one pair out of the pair of the third guide members 53 and the pair of the fourth guide members 54 is set to the first distance L1. The first distance L1 is a distance within a range equal to or more than the maximum width of a pile of sheets 30 stacked on the stacking table 21 in the direction in which the pair of third guide members 53 or the pair of fourth guide members 54 face each other, and equal to or less than the added width that is the maximum permissible error added to the maximum width.

In this manner, in the stacking apparatus 20 according to this embodiment, the facing distance between at least one pair out of the pair of third guide members 53 and the pair of fourth guide members 54 is set to the minimum distance allowing one sheet to be fed and to fall onto the stacking table 21. Therefore, the sheets 30 supplied to the stacking apparatus 20 are guided along the pair of third guide members 53 and the pair of fourth guide members 54 toward the stacking table 21, so that the sheets 30 are aligned precisely.

The facing distance between at least one pair out of the pair of third guide members 53 and the pair of fourth guide members 54 is set to the minimum distance allowing one sheet 30 to be fed and fall on the stacking table 21, so that the following situation can be assumed. To explain more in detail, it is assumed that the sheet 30 does not easily fall or does not become aligned because of the frictional resistance of the sheets 30, against the pair of third guide members 53 and the pair of fourth guide members 54. In the stacking apparatus 20 according to this embodiment, however, the vibrators 60 applies micro-vibration to at least one of the first guide members 51 and the second guide members 52. Therefore, the frictional resistance of the sheet 30 against the first guide members 51 and the second guide members 52 is reduced, and the sequentially supplied sheets 30 fall along the first guide members 51 and the second guide members 52 and are stacked without jamming.

Therefore, the stacking apparatus 20 according to this embodiment can stack the sheets 30 in a precisely aligned manner, without causing damages to each of the sheets 30, due to causes such as jamming.

The stacking system 1 according to this embodiment uses the impellers 42 and the restricting member 43 as the supplying mechanism 40. The impellers 42 and the restricting member 43 then supply the sheets 30 to the stacking table 21 sequentially.

Therefore, in addition to the advantageous effects explained above, the stacking system 1 according to this embodiment can stack the sheets 30 at a high speed.

First Modification

In the embodiment described above, each of the first guide members 51 and the second guide members 52 is a plate-shaped member that is provided to stand on the stacking table 21 in the Z-axis direction, as an example. However, at least one of the first guide members 51 and the second guide members 52 may be partially inclined with respect to the Z-axis direction, in such a manner that the opening that is an entry of the sheets 30 becomes larger on the side further away from the stacking table 21.

Figure 5A:
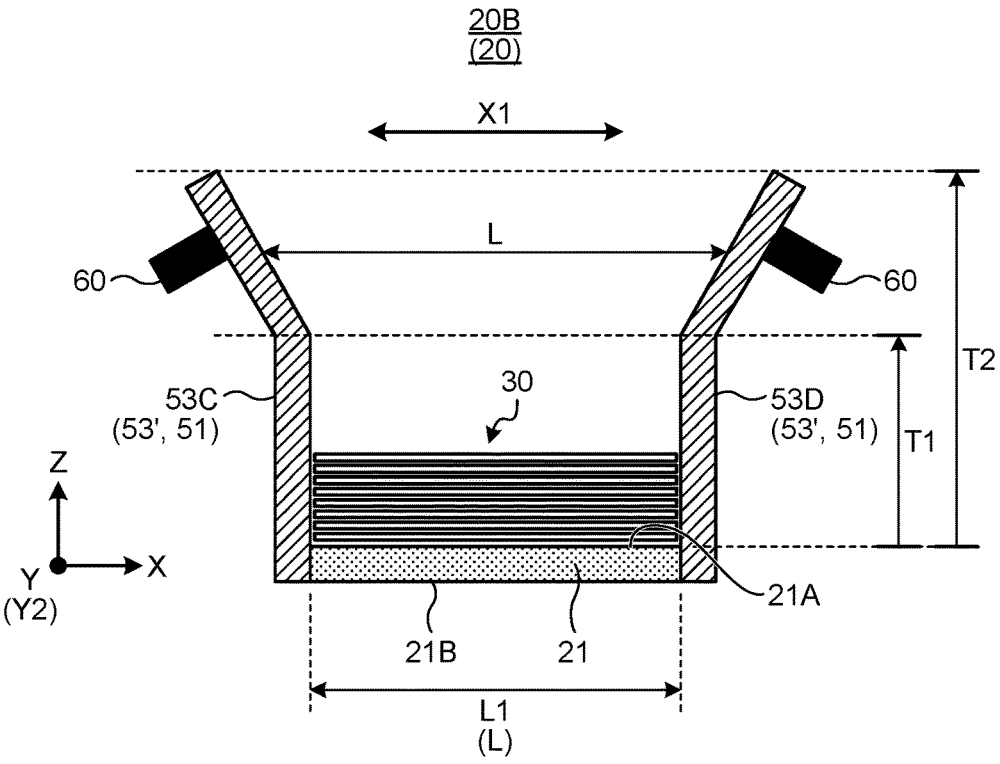
FIG. 5A is a sectional view of a stacking apparatus.

FIG. 4A is a schematic of an example of this stacking apparatus 20B according to this modification. FIG. 5A is a sectional view of an example of the stacking apparatus 20B according to this modification. FIG. 5A illustrates a sectional view of the stacking apparatus 20B taken along the line A-A' in FIG. 4A.

As illustrated in FIG. 4A, the stacking apparatus 20B includes the stacking table 21, the first guide members 51, the second guide members 52, and the vibrators 60, in the same manner as the stacking apparatus 20A. The stacking table 21 and the vibrators 60 are the same as those in the embodiment described above.

The first modification will now be explained with reference with FIG. 5A. The first guide members 51 are members provided to stand on the stacking table 21, in the same manner as in the embodiment described above. In the first modification, the first guide members 51, however, include a pair of third guide members 53' that are disposed with a distance between them in the first width direction X1. To explain more in detail, the first guide member 51 includes a pair of third guide members 53' containing a third guide member 53C and a third guide member 53D.

The facing distance L between the third guide member 53C and the third guide member 53D in a range from the stacking table 21 to a first height T1 is the first distance L1. The first distance L1 is the same as that according to the embodiment described above. The facing distance L between the third guide member 53C and the third guide member 53D in a range from the first height T1 to a second height T2, in the direction moving away from the stacking table 21, increases in the direction from the first height T1 to the second height T2. For example, as illustrated in FIG. 5A, in the stacking apparatus 20B, the third guide members 53' provided as a pair are both disposed in parallel with each other in the range from the stacking table 21 to the first height T1, and are inclined in directions separating from each other in the range from the first height T1 to the second height T2. For this reason, an opening of the stacking apparatus 20B, the opening being a space between the facing third guide member 53C and third guide member 53D in the stacking apparatus 20B, is inclined to become larger in a direction from the first height T1 to the second height T2.

The first height T1 may be any height equal to or higher than the height of a pile of the sheets 30 stacked to the maximum level in the stacking direction (the Z-axis direction). The maximum level of stacking means that a predetermined maximum number of sheets 30 are stacked on the stacking table 21 of the stacking apparatus 20B.

In each of the third guide member 53C and the third guide member 53D, the part extending in parallel with the Z-axis direction and the part inclined with respect to the Z-axis direction may be provided as separate members. In each of the third guide member 53C and the third guide member 53D, the part extending in parallel with the Z-axis direction and the part inclined with respect to the Z-axis direction may also be integrated.

Returning to FIG. 4A, the explanation will be continued. The second guide members 52 are members provided to stand on the stacking table 21, in the same manner as in the embodiment described above. In the first modification, however, the first guide members 51 include a pair of fourth guide members 54' that are disposed with a distance between them in the second width direction Y2. To explain more in detail, the second guide members 52 include a pair of fourth guide members 54' containing a fourth guide member 54C and a fourth guide member 54D.

In the same manner as the third guide member 53C and the third guide member 53D, the facing distance L between the fourth guide member 54C and the fourth guide member 54D is set to the first distance L1, in the range from the stacking table 21 to the first height T1. The first distance L1 is the same as that according to the embodiment described above. The facing distance L between the fourth guide member 54C and the fourth guide member 54D in the range from the first height T1 to the second height T2, in the direction moving away from the stacking table 21, increases in the direction from the first height T1 to the second height T2. For example, in the stacking apparatus 20B, the fourth guide members 54' provided as a pair are both disposed in parallel with each other in the range from the stacking table 21 to the first height T1, and are inclined in directions separating from each other in the range from the first height T1 to the second height T2.

For this reason, an opening of the stacking apparatus 20B, the opening being a space between the facing fourth guide member 54C and fourth guide member 54D in the stacking apparatus 20B, is inclined to become larger in the direction from the first height T1 to the second height T2, in the same manner as the pair of third guide members 53'.

In each of the fourth guide member 54C and the fourth guide member 54D, the part extending in parallel with the Z-axis direction and the part inclined with respect to the Z-axis direction may be provided as separate members. In each of the fourth guide member 54C and the fourth guide member 54D, the part extending in parallel with the Z-axis direction and the part inclined with respect to the Z-axis direction may also be integrated.

Only needed is for the facing distance L that is at least one of the distance between the third guide members 53' provided as a pair including the first guide members 51, and the distance between the fourth guide members 54' provided as a pair including the second guide members 52, to be set to the first distance L1 up to the first height T1, and the facing distance L in a range from the first height T1 to the second height T2 to be set in such a manner that the facing distance L increases in the direction from the first height T1 to the second height T2.

Figure 5B:
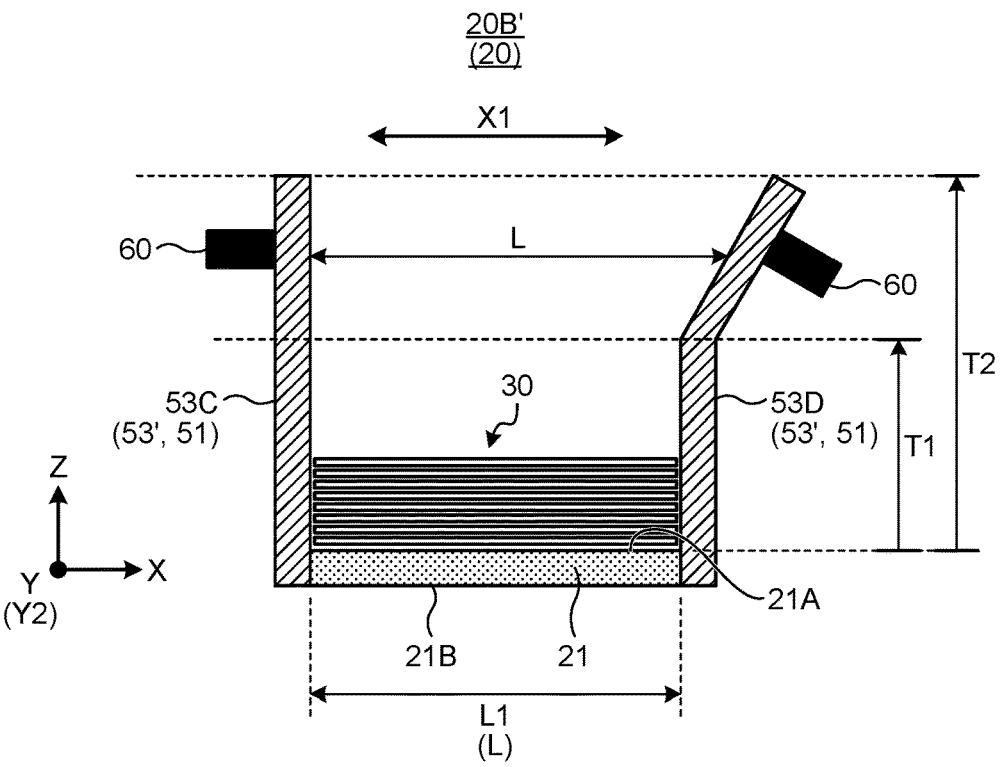
FIG. 5B is a sectional view of a stacking apparatus.

FIG. 5A illustrates an example of a configuration in which the third guide members 53' provided as a pair are both inclined in directions moving away from each other, in the direction from the first height T1 to the second height T2. However, as another possible configuration, as illustrated in FIG. 5B, one of the pair of third guide members 53' may be inclined in a direction moving away from the other, in the direction from the first height T1 to the second height T2. FIG. 5B is a sectional view of an example of a stacking apparatus 20B' according to this modification.

In the same manner for the pair of fourth guide members 54', one of the fourth guide members 54' provided as a pair may be inclined in a direction moving away from the other, in the direction from the first height T1 to the second height T2.

Thus, in the stacking apparatus 20B according to in this modification, the facing distance L between the pair of third guide members 53' and the pair of fourth guide members 54' is set to the first distance L1, in the range from the stacking table 21 to the first height T1. The facing distance L that is at least one of the distance between the third guide members 53' provided as a pair and the distance between the fourth guide members 54' provided as a pair in a range from the first height T1 to the second height T2 is increased in the direction from the first height T1 to the second height T2. The first height T1 is equal to or greater than the height of the sheets 30 stacked to the maximum level in the stacking direction (the Z-axis direction).

For this reason, the sheet 30 released at the release position above the stacking apparatus 20B toward the stacking table 21 of the stacking apparatus 20 is guided onto the stacking table 21 along the inclined portions of the pair of third guide members 53' and the pair of fourth guide members 54', wherein the inclined portions form a larger opening. After being guided along the inclined portions, the sheet 30 reaches the space of the first distance L1 between the pair of third guide members 53' and the pair of fourth guide members 54', and is stacked onto the stacking surface 21A.

Therefore, in addition to the advantageous effects in the embodiment described above, the stacking apparatus 20B in this modification can stack a plurality of sheets 30 in an even more precisely aligned manner.

Second Modification

Explained in the above embodiment is an example in which each of the pair of third guide members 53 including the first guide members 51 and the pair of fourth guide members 54 including the second guide members 52 is a plate-shaped member. However, at least one pair out of the pair of third guide members 53 and the pair of fourth guide members 54 may be separated into separate members.

Figure 6:
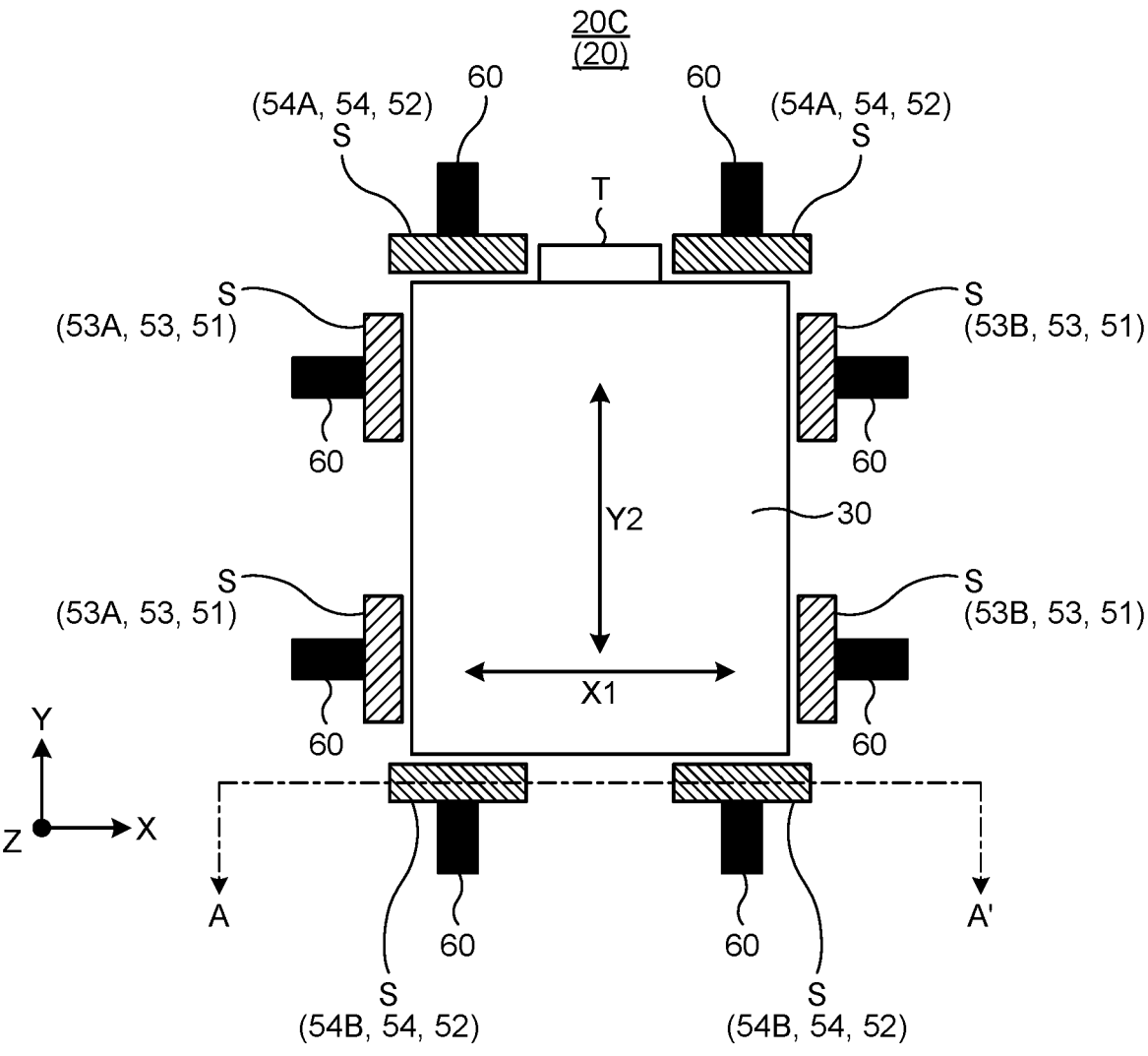
FIG. 6 is a schematic of a stacking apparatus.

FIG. 6 is a schematic of an example of a stacking apparatus 20C according to this modification. The stacking apparatus 20C is an example of the stacking apparatus FIG. 6 illustrates a plan view of the stacking apparatus 20C.

The stacking apparatus 20C includes the stacking table 21, the first guide members 51, the second guide members 52, and the vibrators 60, in the same manner as the stacking apparatus 20A. The stacking table 21 and the vibrators 60 are the same as those in the embodiment described above.

The first guide members 51 are plate-like members that are provided to stand on the stacking table 21, in the same manner as in the embodiment described above. The first guide members 51 contain the pair of third guide members 53, in the same manner as in the embodiment described above.

The second guide members 52 are plate-like members that are provided to stand on the stacking table 21, in the same manner as in the embodiment described above. The second guide members 52 contain the pair of fourth guide members 54, in the same manner as in the embodiment described above.

In this modification, one or both of at least one of the third guide members 53 provided as a pair and at least one of the fourth guide members 54 provided as a pair are separated into a plurality of separate members S.

The separate members S are members into which at least one of the third guide member 53A, the third guide member 53B, the fourth guide member 54A, and the fourth guide member 54B is separated along a direction intersecting with the direction in which the sheets 30 are stacked (the Z-axis direction), in such a manner that at least part of the facing surface facing the sheets 30 stacked on the stacking table 21 is opened.

Preferably, in the separate members S making up one or both of at least one of the third guide members 53 provided as a pair and at least one of the fourth guide members 54 provided as a pair, the opening on the facing surface facing the sheets 30 stacked on the stacking table 21 is provided at a position corresponding to the center between two vertex of the corresponding side of the rectangular principal surface of the sheet 30, and the separate members S are disposed at positions nearer to the respective vertex than to the center.

FIG. 6 illustrates as an example in which each of the third guide member 53A, the third guide member 53B, the fourth guide member 54A, and the fourth guide member 54B are made from two separate members S.

To explain more in detail, the third guide member 53A is separated into two separate members S that restrict positions of one end and the other end of the sheet 30, respectively, in the second width direction Y2. The third guide member 53B is separated into two separate members S that restrict positions of one end and the other end of the sheet 30, respectively, in the second width direction Y2.

In the same manner, the fourth guide member 54A is separated into two separate members S that restrict positions of one end and the other end of the sheet 30, respectively, in the first width direction X1. The fourth guide member 54B is separated into two separate members S that restrict positions of one end and the other end of the sheet 30, respectively, in the first width direction X1.

The opening formed by the separation of the separate members S may be any opening occupying an area that includes an area allowing the tab T to pass therethrough before the sheet 30 supplied into the stacking apparatus 20 is stacked on the stacking table 21. As mentioned earlier, in the above embodiment, the tab T is provided at the center of one of the four sides of the quadrilateral principal surface of the sheet 30. For this reason, in this modification, preferably, the separate members S are separated in such a manner that an opening on the facing surface facing the rectangular sheet 30 stacked on the stacking table 21 is provided at the center between the two vertex of the corresponding side of the principal surface of the sheet 30, and the separate members S are positioned nearer to the respective vertex than to the center.

Also assumed herein is an example in which the tab T is positioned off the center of one of the four sides of the quadrilateral principal surface of the sheet 30. In this case, the separate members S may be separated in any way as long as an opening is formed thereby in an area including an area allowing the tab T to pass therethrough, before the sheet 30 supplied into the stacking apparatus 20 is stacked on the stacking table 21, the opening being formed in the facing surface facing the rectangular sheets 30 stacked on the stacking table 21, and as long as the separate members S are disposed at positions offset from the opening.

The vibrators 60 may be disposed any positions where at least one of the plurality of separate members S can be micro-vibrated. FIG. 6 illustrates an example in which the vibrators 60 are in contact with each of the separate members S so that the vibrators 60 can apply micro-vibration to each of the separate members S.

In the manner described above, any one or both of at least one of the third guide members 53 provided as a pair and at least one of the fourth guide members 54 provided as a pair may be separated into a plurality of separate members S.

With such a configuration separated into the separate members S, the mass of members to be micro-vibrated by the vibrators 60 is reduced. Therefore, the vibrators 60 can apply a larger amount of the micro-vibration to the separate members S, compared with in the configuration in which the first guide member 51 and the second guide member 52 are not separated into the separate members S. Hence, a larger amount of vibration energy resulting from an increased amount of micro-vibration can be applied to the stacked sheets 30. Therefore, the stacking apparatus 20C according to this modification can apply micro-vibration to the sheets 30 stacked in the stacking apparatus 20C more effectively.

Preferably, in the separate members S making up one or both of at least one of the third guide members 53 provided as a pair and at least one of the fourth guide members 54 provided as a pair, an opening on the facing surface facing the sheets 30 stacked on the stacking table 21 is formed at a position corresponding to the center between two vertex of the corresponding side of the rectangular principal surface of the sheet 30, and the separate members S are disposed at positions nearer to the respective vertex than to the center. With this configuration, it is possible to improve the precision of the alignment of the sheets 30.

Preferably, the first guide members 51 and the second guide members 52 are separated into a plurality of separate members S such that the tabs T of the respective stacked sheets 30 are positioned inside the opening of the first guide members 51 and the second guide members 52. With this configuration, it is possible to reduce the chances of the tabs T of the respective stacked sheets 30 from being brought into contact with the first guide members 51 and the second guide members 52, and become damaged.

Therefore, in addition to the advantageous effects achieved in the embodiment described above, the stacking apparatus 20C according to this modification can further suppress damages of the sheets 30 during the process of being stacked. By separating at least one of the first guide members 51 and the second guide members 52 into the separate members S, the first guide members 51 and the second guide members 52 can apply micro-vibration to the sheets 30 efficiently. Therefore, in addition to the advantageous effects achieved in the embodiment described above, the stacking apparatus 20C according to this modification can stack sheets 30 in an even more precisely aligned manner.

Third Modification

The separate member S described in the second modification may also be partially connected to each other.

Figure 7A:
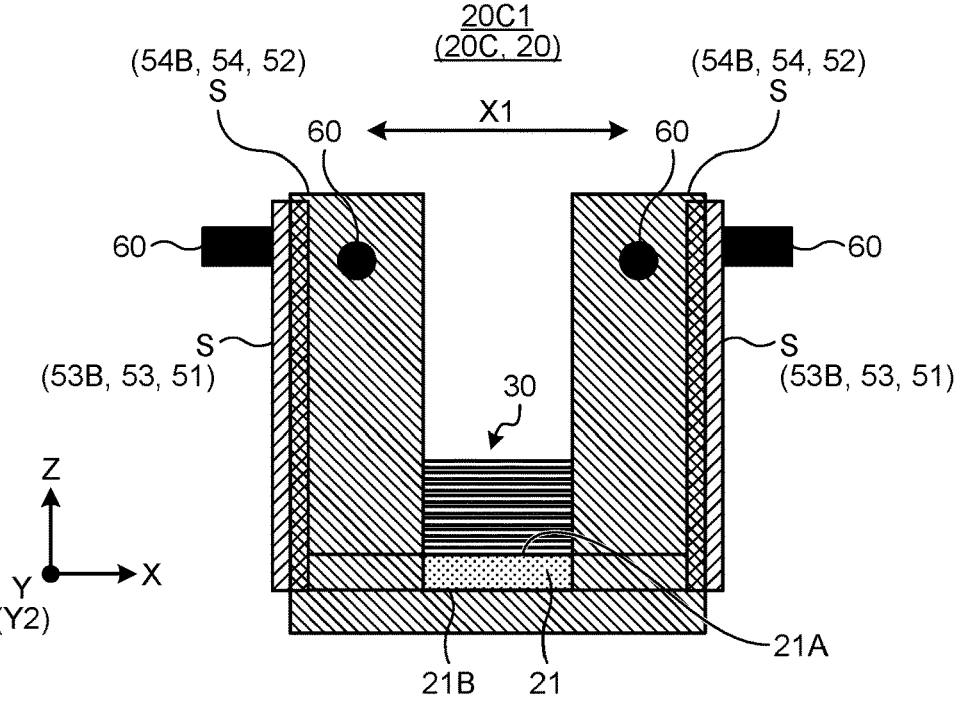
FIG. 7A is a schematic of a stacking apparatus.

FIG. 7A is a schematic illustrating an example of such a stacking apparatus 20C1. The stacking apparatus 20C1 is an example of the stacking apparatus 20C. FIG. 7A is an example of a sectional view of the stacking apparatus 20C taken along the line A-A' in FIG. 6.

For example, the separate members S making up at least each one of the pair of third guide members 53 and the pair of fourth guide members 54 included in the stacking apparatus 20C1 may be connected through a rear surface 21B of the stacking table 21. Specifically, as illustrated in FIG. 7A, the two separate members S making up the fourth guide member 54B may be connected through the rear surface 21B of the stacking table 21. The rear surface 21B of the stacking table 21 is a surface of the stacking table 21 on the rear side of the stacking surface 21A. The two separate members S making up the fourth guide member 54B may also be connected through a side surface of the stacking table 21. The side surface of the stacking table 21 is an edge of the stacking table 21, along the XZ plane.

Figure 7B:
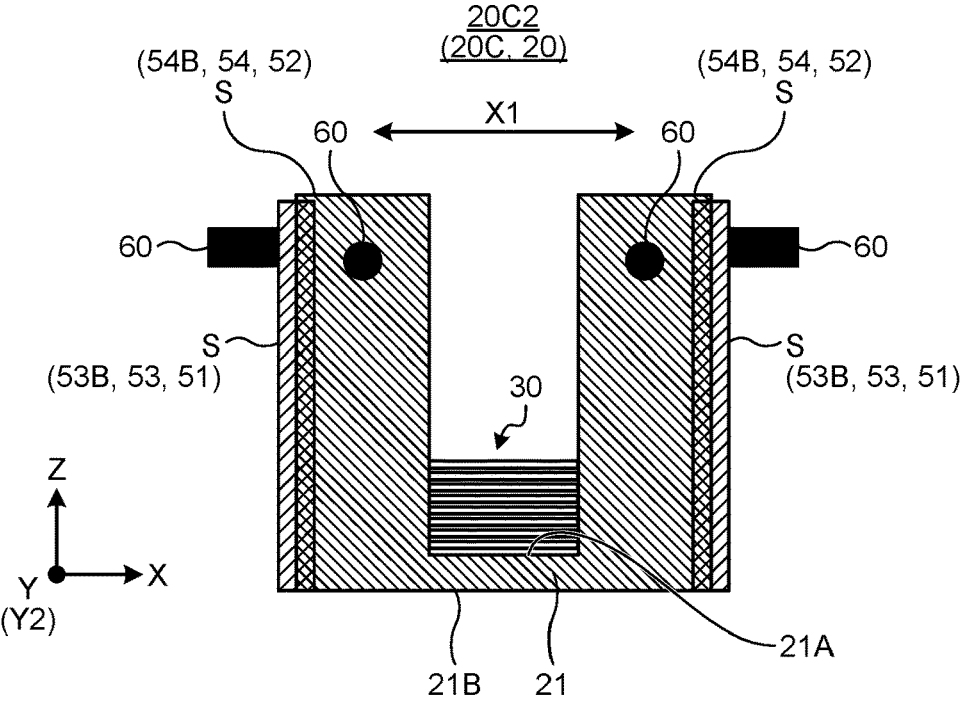
FIG. 7B is a schematic of the stacking apparatus.

FIG. 7B is a schematic illustrating an example of such a stacking apparatus 20C2. The stacking apparatus 20C2 is an example of the stacking apparatus 20C. FIG. 7B is an example of a sectional view of the stacking apparatus 20C taken along the line A-A' in FIG. 6.

For example, the separate members S making up at least each one of the pair of third guide members 53 and the pair of fourth guide members 54 included in the stacking apparatus 20C2 may be molded integrally with the stacking table 21, in a manner connected through the stacking table 21.

Specifically, as illustrated in FIG. 7B, the two separate members S making up the fourth guide member 54B may be molded integrally with the stacking table 21, in a manner connected through the stacking table 21.

This structure in which the separate members S are partially connected to each other makes it easy to attach and to assemble the first guide members 51 and the second guide members 52.

Fourth Modification

Explained in the embodiment above is an example in which the supplying mechanism 40 includes the impellers 42 and the restricting member 43. However, the supplying mechanism 40 is not limited to the impellers 42 and the restricting member 43, as long as the supplying mechanism 40 is a mechanism for sequentially collecting the sheets 30 having been conveyed by the subsequent-stage conveyor unit 34C, and sequentially supplying the collected sheets 30 into the stacking apparatus 20 in the order collected.

For example, the supplying mechanism 40 may be a holding mechanism.

Figure 8:
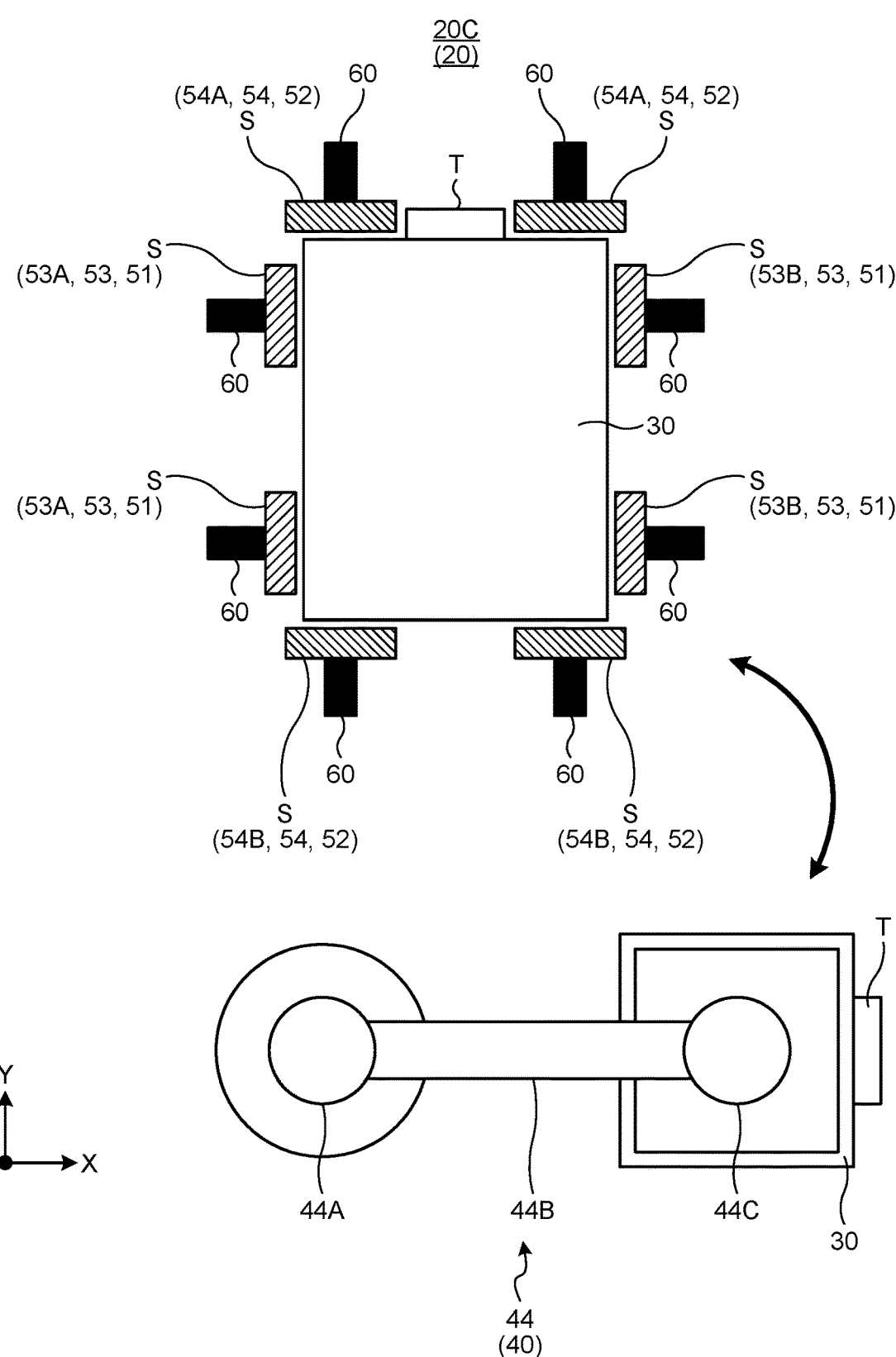
FIG. 8 is a schematic of a holding mechanism.

FIG. 8 is a schematic of an example of a holding mechanism 44. The holding mechanism 44 is an example of the supplying mechanism 40. FIG. 8 also illustrates the stacking apparatus 20C for the purpose of explanation.

The holding mechanism 44 has a rotating portion 44A, a support 44B, and a suction unit 44C. The rotating portion 44A supports one end of the bar-shaped support 44B in the direction in which the support 44B extends, and supports the support 44B so as to enable it to rotate. The suction unit 44C is supported on the other end of the support 44B in the direction in which the support 44B extends. The suction unit 44C is a mechanism for keeping the sheet 30 suctioned thereto, and for releasing the sheet 30 suctioned thereto.

The holding mechanism 44 holds the sheet 30 conveyed by the conveying mechanism 34 (see FIG. 1) for conveying the sheet 30. To explain more in detail, the holding mechanism 44 holds the sheet 30, with the sheet 30 suctioned by the suction unit 44C of the holding mechanism 44. The holding mechanism 44 releases the sheet 30 thus suctioned, at the release position above the stacking apparatus 20. To explain more in detail, while the suction unit 44C of the holding mechanism 44 keeps the sheet 30 suctioned thereto, the rotating portion 44A is driven in rotation, and moves the position of the suction unit 44C up to the release position above the stacking apparatus 20C. At the release position above the stacking apparatus 20C, the suction unit 44C in the holding mechanism 44 releases the sheet 30 suctioned thereto. The holding mechanism 44 repeats these series of processes to sequentially supply the sheets 30 to the stacking table 21 in the stacking apparatus 20C.

The stacking system 1 including the holding mechanism 44 according to this modification as the supplying mechanism 40 is provided with the stacking apparatus 20 described above. The stacking apparatus 20 causes the vibrators 60 to apply micro-vibration to the stacked sheets 30, via at least one of the first guide members 51 and the second guide members 52. Therefore, the stacking apparatus 20 according to the embodiment described above can stack a plurality of sheets 30 in a precisely aligned manner. Because the stacking apparatus 20 can stack the sheets 30 in a precisely aligned manner, the supplying mechanism 40 for supplying the sheets 30 into the stacking apparatus 20 may have a simple structure not quite capable of supplying the sheets 30 in a manner aligned with respect to the stacking apparatus 20 precisely. Therefore, the stacking system 1 according to this modification can stack the sheets 30 in a precisely aligned manner, even if using a supplying mechanism 40 that has a simple structure or includes a holding mechanism 44 with a low supplying precision.

The stacking system 1 according to this modification can stack the sheets 30 at a higher speed by using a supplying mechanism 40, such as a holding mechanism 44, capable of supplying sheets 30 to the stacking apparatus 20 at a high speed but less precisely.

The stacking system 1 may include a plurality of the holding mechanisms 44. By providing the system with a plurality of the supplying mechanisms 40, the stacking system 1 can stack sheets 30 precisely at a high speed, without damaging the sheets 30.

The stacking apparatus 20 and the stacking system 1 described above in the embodiments and the modifications are applicable as an apparatus for stacking various types of sheets 30. In other words, explained in the embodiment and the modifications is an example in which the sheet 30 is a member used as an electrode. However, the sheet 30 may be any thin film-like material to be stacked. For example, the sheet 30 may be a bank bill. The stacking apparatus 20 and the stacking system 1 according to this embodiment are particularly suitable for an apparatus or a system intended for stacking new bills as the sheets 30.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stacking apparatus comprising:
   a stacking table including a stacking surface on which sheets are sequentially stacked;
   a first guide member provided to stand on a first side of the stacking table, the first guide member restricting position of edges in a first width direction of the sheets stacked on the stacking table;
   a second guide member provided to stand on a second side of the stacking table, the second guide member restricting position of edges in a second width direction of the sheets stacked on the stacking table, the second width direction intersecting with the first width direction; and
   a vibrator provided at an upper portion of at least one of the first guide member and the second guide member in a direction in which the sheets are stacked and configured to apply micro-vibration to at least one of the first guide member and the second guide member,
   wherein
      a surface on an upper edge side of each of the first guide member and the second guide member in the direction in which the sheets are stacked is positioned on an equal level to or on an upper side than an uppermost surface of a pile of the sheets stacked in the direction in which the sheets are stacked; and
      a surface on a bottom edge side of each of the first guide member and the second guide member in the direction in which the sheets are stacked is positioned on an equal level to or on a lower side than a bottom surface of the pile of the sheets stacked in the direction in which the sheets are stacked.

2. The stacking apparatus according to claim 1, wherein the vibrator is configured to start applying the micro-vibration before stacking of the sheets on the stacking table is started, and keep applying the micro-vibration during a period in which the sheets are being stacked on the stacking table.

3. The stacking apparatus according to claim 1, wherein the first guide member includes a pair of third guide members disposed with a distance from each other in the first width direction, and the second guide member includes a pair of fourth guide members disposed with a distance from each other in the second width direction.

4. The stacking apparatus according to claim 3, wherein a facing distance between at least one pair out of the pair of third guide members and the pair of fourth guide members is set to a first distance, the first distance being in a range:

equal to or more than a maximum width of a pile of the sheets stacked on the stacking table in a direction in which the corresponding one pair out of the pair of third guide members and the pair of fourth guide members face each other, and equal to or less than an added width that is a maximum permissible error added to the maximum width.

5. The stacking apparatus according to claim 4, wherein a facing distance between at least one pair out of the pair of third guide members and the pair of fourth guide members in a range from the stacking table to a first height is set to the first distance, the first height being equal to or more than a height of a pile of the sheets stacked to a maximum level, and a facing distance between at least one pair out of the pair of third guide members and the pair of fourth guide members increases in a direction from the first height toward the second height, in a range from the first height to a second height in the direction moving away from the stacking table.

6. The stacking apparatus according to claim 3, wherein the vibrator is configured to apply micro-vibration to at least one of the pair of third guide members and/or at least one of the pair of fourth guide members.

7. The stacking apparatus according to claim 3, wherein at least one of the pair of third guide members and/or at least one of the pair of fourth guide members are disposed to be separated into a plurality of separate members in a direction intersecting with the direction in which the sheets are stacked, in such a manner that at least part of the facing surface facing the sheets stacked on the stacking table is opened.

8. The stacking apparatus according to claim 7, wherein, in the plurality of separate members making up at least one of the pair of third guide members and/or at least one of the pair of fourth guide members, the opening on the facing surface facing the sheets stacked on the stacking table is provided at a position corresponding to a center between vertex of a corresponding side of a rectangular principal surface of the sheet, and the separate members are disposed at positions nearer to the respective vertex than to the center.

9. The stacking apparatus according to claim 7, wherein the plurality of separate members making up each one of at least one of the pair of third guide members and the pair of fourth guide members are connected through a rear surface of the stacking surface or a side surface of the stacking table.

10. The stacking apparatus according to claim 7, wherein the plurality of separate members making up each of at least one of the pair of third guide members and the pair of fourth guide members are molded integrally with the stacking table and are connected through the stacking table.

11. The stacking apparatus according to claim 1, wherein the sheet includes a pair of separators and a thin-film sheet member interposed between the pair of separators, part of one end of the sheet member provides a tab protruding out from the pair of separators and exposed to outside, part of each of the pair of separators has a protrusion, the part being part of a portion corresponding to the tab, the protrusion protruding in a direction in which the tab protrudes in a manner covering an area including an end of the tab, the end being an end on a side of a main part of the sheet member, and the protrusions of the pair of respective separators have respective ends bonded to each other, the ends being ends in a direction intersecting with the direction in which the tab protrudes.

12. A stacking system comprising:

the stacking apparatus according to claim 1; and a guiding apparatus including at least one conveyor that conveys sheets supplied from a supplying unit toward the stacking apparatus and configured to guide the sheets onto the stacking table of the stacking apparatus.

13. The stacking system according to claim 12, wherein the guiding apparatus includes an impeller and a restricting member that supply the sheets to the stacking table, the sheets having been conveyed from a conveying mechanism serving to convey the sheets, the impeller includes a plurality of vanes, and the impeller is configured to supply the sheets sequentially to the stacking table by collecting each of the conveyed sheets between the vanes, rotating the collected sheet while holding the collected sheet to carry the sheet up to a release position of the stacking table, causing the restricting member to release the sheet held between the vanes at the release position, and causing the sheet to fall toward the stacking table.

14. The stacking system according to claim 12, wherein the guiding apparatus includes a holding mechanism, the holding mechanism including a suction unit capable of switching between keeping a sheet suctioned and releasing the sheet from being suctioned and configured to stack the sheets sequentially to the stacking table by holding, with suction and by the suction unit, the sheet conveyed from the conveying mechanism, and releasing, by the suction unit, the held sheet at a release position of the stacking table.

15. The stacking apparatus according to claim 1, wherein the micro-vibration is vibration whose amplitude is ±10 μm or smaller and vibration frequency is 50 Hz or higher.

* * * * *